US011027733B2

(12) United States Patent
Larsson et al.

(10) Patent No.: US 11,027,733 B2
(45) Date of Patent: Jun. 8, 2021

(54) VEHICLE SPEED CONTROL SYSTEM

(71) Applicant: VOLVO TRUCK CORPORATION, Gothenburg (SE)

(72) Inventors: Lena Larsson, Västra Frölunda (SE); Jan Öberg, Gothenburg (SE); Filip Alm, Bohus (SE)

(73) Assignee: VOLVO TRUCK CORPORATION, Gothenburg (SE)

(*) Notice: Subject to any disclaimer, the term of this patent is extended or adjusted under 35 U.S.C. 154(b) by 662 days.

(21) Appl. No.: 15/577,490

(22) PCT Filed: Jun. 17, 2015

(86) PCT No.: PCT/EP2015/063569
§ 371 (c)(1),
(2) Date: Nov. 28, 2017

(87) PCT Pub. No.: WO2016/202378
PCT Pub. Date: Dec. 22, 2016

(65) Prior Publication Data
US 2018/0148058 A1 May 31, 2018

(51) Int. Cl.
B60W 30/18 (2012.01)
B60W 30/14 (2006.01)
(Continued)

(52) U.S. Cl.
CPC ...... B60W 30/18063 (2013.01); B60W 10/02 (2013.01); B60W 10/04 (2013.01);
(Continued)

(58) Field of Classification Search
CPC .......... B60W 30/18063; B60W 10/04; B60W 10/02; B60W 10/18; B60W 30/143;
(Continued)

(56) References Cited

U.S. PATENT DOCUMENTS

| 5,521,825 A * | 5/1996 | Unuvar ................. F02D 11/105 |
| | | 123/339.1 |
| 5,941,614 A | 8/1999 | Gallery et al. |
| 2015/0239470 A1* | 8/2015 | Rindfleisch ........... B60W 10/06 |
| | | 701/110 |

FOREIGN PATENT DOCUMENTS

| DE | 3421387 A1 | 12/1985 |
| DE | 19937972 A1 | 2/2001 |

(Continued)

OTHER PUBLICATIONS

International Search Report (dated Mar. 8, 2016) for corresponding International App. PCT/EP2015/063569.

Primary Examiner — Jeffrey C Boomer
(74) Attorney, Agent, or Firm — Venable LLP; Jeffri A. Kaminski

(57) ABSTRACT

A vehicle speed control system includes a vehicle accelerator mechanism manually moveable between a plurality of positions, a detection arrangement configured to detect the position of the vehicle accelerator mechanism and to generate an output signal indicative of the position of the vehicle accelerator mechanism, and a vehicle speed controller configured to establish a speed of the vehicle as a function of the detected position of the manually controllable vehicle accelerator mechanism, and to use the output signal as an input speed control signal. A method of controlling speed of a vehicle by a vehicle speed control system is also provided.

9 Claims, 13 Drawing Sheets

(51) Int. Cl.
*B60W 50/10* (2012.01)
*B60K 26/02* (2006.01)
*B60W 10/04* (2006.01)
*B60W 10/02* (2006.01)
*B60W 10/18* (2012.01)
*B60W 50/00* (2006.01)

(52) U.S. Cl.
CPC .......... *B60W 10/18* (2013.01); *B60W 30/143* (2013.01); *B60W 30/18036* (2013.01); *B60W 50/10* (2013.01); *B60K 26/02* (2013.01); *B60W 2050/0064* (2013.01); *B60W 2050/0066* (2013.01); *B60W 2300/12* (2013.01); *B60W 2540/10* (2013.01); *B60W 2540/106* (2013.01); *B60W 2540/12* (2013.01); *B60W 2540/21* (2020.02); *B60W 2720/10* (2013.01)

(58) Field of Classification Search
CPC .......... B60W 30/18036; B60W 50/10; B60W 2540/21; B60W 2540/106; B60W 2050/0064; B60W 2050/0066; B60W 2300/12; B60W 2540/10; B60W 2540/12; B60W 2720/10; B60K 26/02
See application file for complete search history.

(56) References Cited

FOREIGN PATENT DOCUMENTS

| | | |
|---|---|---|
| DE | 10105749 A1 | 8/2002 |
| DE | 102006027866 A1 | 1/2008 |
| DE | 102013211974 A1 | 1/2015 |
| EP | 0992412 A1 | 4/2000 |
| EP | 1375278 A2 | 1/2004 |
| WO | 2007139482 A1 | 12/2007 |

\* cited by examiner

VEHICLE SPEED CONTROL SYSTEM

BACKGROUND AND SUMMARY

The invention relates to a vehicle speed control system comprising a vehicle accelerator mechanism manually moveable between a plurality of positions, detection means configured to detect the position of the vehicle accelerator mechanism and a vehicle speed controller configured to establish a speed of the vehicle as a function of the detected position of the manually controllable vehicle accelerator mechanism. The invention also relates to a method of controlling speed of a vehicle by a vehicle speed control system. Furthermore, the invention relates to a vehicle comprising vehicle speed control system.

The invention can be applied in heavy-duty vehicles, such as trucks, buses and construction equipment. Although the invention will be described in relation to a truck, the invention is not restricted to this particular vehicle, but may also be used in other types of vehicles such as cars, industrial construction machines, wheel loaders, etc.

In recent years, the control of a vehicle at low speeds has been continuously developed so as to allow the vehicle to be operated smoothly in various situations such as when a truck is operated in a reverse direction to couple to a swap body or the like. Typically, the operator of the vehicle can control the vehicle speed by controlling the engine speed via the manual accelerator pedal. However, problems can occur in operating the vehicle at low speeds, in particular for vehicles including a reciprocating engine such as a diesel engine due to that the engine is required to operate at a certain number of revolutions. Other types of engines such as hydraulic engines and electric motors are sometimes also operated at a low speeds for certain purposes.

In addition, some situations may require a very low ground speed to allow the operator to control the vehicle in an efficient and comfortable manner. As an example, a very low ground speed is typically advantageous when a vehicle such as truck is operated in a reverse direction for the purposes of coupling the truck to a trailer.

For this type of vehicles it has often been an aim to improve the flexibility of the operator of the vehicle, while maintaining a high level of safety during the operation.

Several attempts to achieve this have been carried out. In DE 102006027866 A1, for example, there is disclosed a method for controlling the operation of a vehicle having a vehicle control device configured to control the actuation of a clutch. The vehicle control device is connected to an actuation angle sensor on the accelerator pedal in order to measure a deflection angle of the accelerator pedal. By measuring the accelerator pedal deflection angle, the vehicle control device is capable of determining a nominal driving speed by means of a characteristic curve that can be used to adjust the degree of the engagement of the clutch so that the nominal driving speed of the vehicle can be reached when desired by the operator of the vehicle.

However, despite the activity in the field, exemplified by the above-cited disclosure, there remains a need for an improved vehicle speed control system and method which combines high functionality with an acceptable level of safety for the user. In particular, there is a need for a solution of controlling a vehicle at low speeds, or very low speed, while ensuring a smooth travelling in various environments.

It is desirable to provide a user-activated and user-operated vehicle speed control system, which allows for improved vehicle speed control at low speeds, or very low speeds, by a manual control of the speed of the vehicle as a function of the position of the vehicle accelerator mechanism.

Thus, according to the first aspect of the invention there is provided a vehicle speed control system, which comprises:
 a vehicle accelerator mechanism manually moveable between a plurality of positions,
 detection means configured to detect the position of the vehicle accelerator mechanism and to generate an output signal indicative of the position of the vehicle accelerator mechanism.

Moreover, the vehicle speed control system comprises a vehicle speed controller configured to establish a speed of the vehicle as a function of the detected position of the manually controllable vehicle accelerator mechanism and to use said output signal as an input speed control signal.

Further, the vehicle speed controller is configured to be operably activated by a user and to operate any one of a clutch unit, propulsion unit and service brake, wherein, when the vehicle speed controller is operably activated by the user to use the output signal as an input speed control signal, the vehicle speed controller is further configured to be operated by the user to control the speed of the vehicle by an operation of any one of the clutch unit, the propulsion unit and the service brake, allowing the user to manually control the speed of the vehicle as a function of the position of the vehicle accelerator mechanism.

By the provision of a system which comprises a vehicle speed controller being configured to be operably activated by a user and the provision that, when the vehicle speed controller is operably activated by the user to use the output signal as an input speed control signal, the vehicle speed controller is further capable of being operated by the user to control the speed of the vehicle by an operation of any one of the clutch unit, the propulsion unit and the service brake, it becomes possible for the user to manually control the speed of the vehicle as a function of the position of the vehicle accelerator mechanism. In other words, it becomes possible to provide a vehicle speed control function which is based on using a position of a manually controlled vehicle accelerator mechanism as an input to operate any one of the clutch unit, the propulsion unit and the service brake so that the vehicle speed can be better controlled when the vehicle is required to be operated at a low speed, or very low speed (typically corresponding to creep drive). To this end, the example embodiments of the invention provide an improved creep drive speed control.

In addition, these provisions provide the advantage that the user is capable of activating the function of the vehicle speed controller and subsequently operate the vehicle in order to control the vehicle speed rating as a function of the position of the vehicle accelerator mechanism. Only as an example, as will be further described herein, the operation of the vehicle speed controller can be based on a set of pre-programmed or predetermined vehicle speed ratings as a function of the position of the vehicle accelerator mechanism.

Upon activation of the vehicle speed controller by the user, the vehicle speed of the vehicle may typically be controlled by using at least the rotational speed of the propulsion unit. In addition, or alternatively, the vehicle speed of the vehicle can, upon activation of the vehicle speed controller by the user, be controlled by adjusting the clutch engagement of the clutch unit. In addition, or alternatively, the vehicle speed of the vehicle can, upon activation of the vehicle speed controller by the user, be controlled by operating the service brake. In particular, the vehicle speed of the vehicle is typically controlled by the service brake to avoid sudden increases in the vehicle speed, e.g. occurring when a wheel of the vehicle encounters a bump on the ground. In this type of incident, the clutch unit may initially be actuated to overcome the increased resistance while maintaining a constant speed, followed by a service brake actuation to limit the sudden acceleration when the wheel passes the bump on the ground.

By a configuration, as mentioned above, that is adapted to detect the position of the vehicle accelerator mechanism and to generate an output signal indicative of the position of the vehicle accelerator mechanism, the system is configured to determine a speed of the vehicle as a function of the detected position of the manually controllable vehicle accelerator mechanism instead of using the vehicle accelerator mechanism as a revolution regulator, torque regulator or a combination of a revolution regulator and a torque regulator. In this manner, the speed of the vehicle is determined to be zero when the vehicle accelerator mechanism is in a start position (initial position). In addition, this configuration means that the vehicle speed is a direct function of the position of the vehicle accelerator mechanism.

It is to be noted that the vehicle speed controller, as mentioned herein, typically is different from a conventional cruise control in that the vehicle speed controller is configured for allowing the use to manually control the speed of the vehicle as a function of the position of the vehicle accelerator mechanism. As is well-known in the art, a cruise control is not capable of controlling the speed of the vehicle as a function of the position of the vehicle accelerator mechanism. In addition, the vehicle speed controller is configured for being activated in at low speed, or very low speed. Thus, in some example embodiments, the vehicle speed control is regarded as a vehicle low speed controller. Accordingly, the invention also relates to a vehicle low speed controller including any one of the features as mentioned herein.

The vehicle speed controller may include a processing circuitry, a microprocessor, microcontroller, programmable digital signal processor or another programmable device. The vehicle speed controller may also, or instead, include an application specific integrated circuit, a programmable gate array or programmable array logic, a programmable logic device, or a digital signal processor. Where the vehicle speed controller includes a programmable device such as the microprocessor, microcontroller or programmable digital signal processor mentioned above, the processor may further include computer executable code that controls operation of the programmable device.

According to one example embodiment, the vehicle speed controller comprises data reflecting vehicle speed rating as a function of the position of the vehicle accelerator mechanism. Moreover, in this example embodiment, the vehicle speed controller is configured to operate any one of the clutch unit, the propulsion unit and the service brake based on the data to control the speed of the vehicle. In this manner, the driver (or operator) of the vehicle can set a suitable vehicle speed rating as function of the deflection angle of the vehicle accelerator mechanism, e.g. a vehicle speed rating extending between 0-5 km/h. As an example, the data reflecting the vehicle speed rating as a function of the position of the accelerator mechanism can be predetermined and/or programmed prior to use, either by the driver of the vehicle or by the manufacturer of the vehicle. By allowing the driver to set a suitable vehicle speed rating as a function of the deflection angle of the vehicle accelerator mechanism, this example embodiment further contributes to improve the human-machine interaction, i.e. it allows for a comfortable and effective operation and control of the vehicle from the human end. In other words, by setting a suitable vehicle speed rating as a function of the deflection angle, the vehicle speed controller is configured to determine the ground speed of the vehicle based on the deflection angle. As is further used herein, the vehicle speed rating may also sometimes be denoted as a user-specific vehicle speed rating.

According to one example embodiment, the vehicle speed controller comprises a user interface for receiving user-specific data and configured to permit the user to set a user-specific vehicle speed rating as a function of the position of the vehicle accelerator mechanism. As an example, the user-interface may allow the driver to set a suitable vehicle speed rating as a function of the deflection angle of the vehicle accelerator mechanism, e.g. a vehicle speed rating extending between 0-5 km/h. In some example embodiments, the user-interface may be provided by a button on the instrument panel. However, other examples are also conceivable as will be further described herein. By allowing the driver to set a suitable user-specific vehicle speed rating as a function of the deflection angle of the vehicle accelerator mechanism, this example embodiment further contributes to improve the human-machine interaction, i.e. it allows for a comfortable and effective operation and control of the vehicle from the human end. In other words, by setting a suitable vehicle speed rating as a function of the deflection angle, the vehicle speed controller is configured to determine the ground speed of the vehicle based on the deflection angle.

According to one example embodiment, the vehicle speed controller is configured to permit the user to set a user-specific vehicle acceleration and retardation rating as a function of the position change per time unit of the vehicle accelerator mechanism. Typically, the vehicle speed controller comprises a user interface for receiving user-specific data and configured to permit the user to set a user-specific vehicle acceleration and retardation rating as a function of the position change per time unit of the vehicle accelerator mechanism.

In this manner, the rate of change of the speed of the vehicle as a response to the deflection of the accelerator mechanism can be set according to the driver's (user's) wishes. The rate of change of the speed of the vehicle is typically defined and set under varying circumstances by the driver (user). This type of configuration of the vehicle speed controller may typically correspond to a ramp function. The ramp function may comprise a substantially linear function. In addition, or alternatively, the ramp function may comprise a substantially non-linear function. Ramp functions are well-known functions, and thus not further described herein.

By allowing the driver to set a user-specific vehicle acceleration and retardation rating as a function of the position change per time unit of the vehicle accelerator mechanism, this example embodiment further improves the human-machine interaction between the driver and the vehicle so that the acceleration and retardation of the vehicle is smooth and performed at a controlled rate.

Typically, although not strictly necessary, a total swivel range of the vehicle accelerator mechanism, as defined by the plurality of the positions of vehicle accelerator mechanism, may correspond to a vehicle speed range between 0-20 km/h. Still preferably, a swivel range of the vehicle accelerator mechanism, as defined by the plurality of the positions of vehicle accelerator mechanism, may correspond to a vehicle speed range between 0-10 km/h. Still preferably, a swivel range of the vehicle accelerator mechanism, as defined by the plurality of the positions of vehicle accelerator mechanism, may correspond to a vehicle speed range between 0-5 km/h.

In addition, or alternatively, a swivel range of the vehicle accelerator mechanism, as defined by the plurality of the positions of vehicle accelerator mechanism, may be defined so that a maximum vehicle speed is less than 20 km/h.

According to one example embodiment, a first part of a swivel range of the vehicle accelerator mechanism, as defined by the plurality of the positions of vehicle accelerator mechanism, may correspond to a low speed range of 0-5 km/h, wherein the vehicle speed controller is further configured to disable the activation of manually controlling the speed of vehicle as a function of the position of the vehicle accelerator mechanism if the vehicle accelerator mechanism is moved into a position outside said first part of the swivel range. In this context, it is to be noted that the position outside said first part of the swivel range may sometimes refer to the kick-down mode. Thus, still most of the swivel range is for controlling in the low speed range of for example 0-5 km/h. A kick-down mode of a vehicle is a well-established term and thus not further described herein. In addition, it is to be noted that when the vehicle speed controller is disabled, i.e. the activation of manually controlling the speed of vehicle as a function of the position of the vehicle accelerator mechanism is disabled, the function of the vehicle accelerator mechanism is transformed to be used as a conventional revolution regulator or torque regulator.

According to some example embodiments, the vehicle speed controller is further configured to establish a speed of the vehicle as a function of the detected position of the manually controllable vehicle accelerator mechanism by measuring the speed of the vehicle by means of GPS, Doppler radar, image processing or an accelerometer. One advantage with using either GPS, Doppler radar, image processing or an accelerometer is that details on the speed of the vehicles may be more sophisticated or comprehensible compared to more conventional means.

Alternatively, or in addition, a speed of the vehicle as a function of the detected position of the manually controllable vehicle accelerator mechanism may be established by a sensor such as a sensor configured for measuring revolutions. One type of sensor for measuring revolutions is a high frequency sensor. Typically, the sensor may be arranged on a shaft of the vehicle that is capable of providing an indication of the speed of the vehicle. As an example, the sensor may be arranged on a transmission input shaft (gear box input shaft).

In one example embodiment, the vehicle speed controller is further configured to control the steering force based on the ground speed of the vehicle. In this manner, it becomes possible to further improve handling and ride comfort for certain situations, e.g. when cornering, changing lanes or parking. Typically, the control of the steering force is achieved by operating an electric motor attached to the steering shaft, wherein the electric motor is cooperating with a hydraulic power steering system of the vehicle.

Accordingly, in one example embodiment, the vehicle speed controller is further configured to control the steering force of the vehicle upon activation of the vehicle speed controller by the user.

In another example embodiment, the vehicle speed controller is further configured to control the steering ratio based on the ground speed of the vehicle. In this manner, it becomes possible to further improve handling and ride comfort for certain situations, e.g. when cornering, changing lanes or parking. To this end, the vehicle speed controller may be configured to vary the steering ratio so that the steering ratio is increased at low speeds. The function of controlling the steering ratio is particularly applicable to a steer by wire system of a vehicle. Typically, the control of the steering ratio is achieved by controlling the electronic control system of the steer by wire system. Accordingly, in one example embodiment, the vehicle speed controller is further configured to control the steering ratio of the vehicle upon activation of the vehicle speed controller by the user.

Typically, although not strictly required, the function of the vehicle speed controller to use the output signal as an input control speed signal is operably activated by the user via any one of a cruise control unit, gear shift member, interior vehicle user-interface, remote control unit, voice control unit.

In other words, the vehicle speed controller may be operably activated by the user via any one of the cruise control unit, gear shift member, interior vehicle user-interface, remote control unit, voice control unit.

Typically, although not strictly required, the operation of any one of the clutch unit, the propulsion unit and the service brake via the vehicle speed controller is operable by the user via a cruise control unit, gear shift member, interior vehicle user-interface, remote control unit, voice control unit.

In other words, the vehicle speed controller may be operably activated and further operable by the user via any one of the cruise control unit, gear shift member, interior vehicle user-interface, remote control unit, voice control unit.

The invention also relates to a vehicle, which comprises a vehicle speed control system according to the first aspect and/or any one of the example embodiments as mentioned above with respect to the first aspect of the invention.

In various example embodiments, the vehicle further comprises a propulsion unit for powering the vehicle, a clutch unit for transmitting a rotational torque from the propulsion unit to a driven shaft and a service brake unit for braking the vehicle.

Typically, the propulsion unit is any one of an internal combustion engine, an electric engine, and a hydraulic machine.

Although the invention will be described in relation to a truck, the invention is not restricted to this particular vehicle, but may also be used in other type of vehicles such as buses, construction equipment, cars, industrial construction machines, wheel loaders, articulated haulers, excavators etc. Hence, the invention is also particularly useful in various work machines.

Thus, according to the second aspect of the invention there is provided a method of controlling speed of a vehicle by a vehicle speed control system. The system comprises a vehicle accelerator mechanism manually moveable between a plurality of positions, detection means configured to detect the position of the vehicle accelerator mechanism and a vehicle speed controller connected to the detection means. Moreover, the method comprises the steps of:
  detecting the position of the vehicle accelerator mechanism by the detection means,
  generating an output signal indicative of the position of the vehicle accelerator mechanism,
  using the output signal as an input speed control signal upon activation of the vehicle speed controller by a user, wherein, when the vehicle speed controller is operably activated by the user to use the output signal as an input speed control signal, the method further comprises the step of operating any one of a clutch unit, a propulsion unit and a service brake in the vehicle to control the speed of the vehicle so that a user is permitted to manually control the speed of the vehicle as a function of the position of the vehicle accelerator mechanism.

Effects and features of this second aspect of the invention are largely analogous to those described above in relation to the system aspects of the present invention.

According to an example embodiment, the method may further include the step of controlling the speed of the vehicle by operating any one of the clutch unit, the propulsion unit and the service brake based on data reflecting vehicle speed rating as a function of the position of the vehicle accelerator mechanism.

According to an example embodiment, the method may further comprise the step of controlling the speed of the vehicle by adjusting the rotational speed of a propulsion unit.

In addition, or alternatively, the method may further comprise the step of controlling the speed of the vehicle by adjusting the clutch engagement of the clutch unit.

In addition, or alternatively, the method may further comprise the step of controlling the speed of the vehicle by actively controlling the service brake to maintain a constant vehicle speed.

According to a third aspect of the invention there is provided a computer program comprising program code means for performing the method steps of the example embodiments, when the program is run on a computer.

Effects and features of this third aspect of the invention are largely analogous to those described above in relation to the other aspects of the present invention.

According to a fourth aspect of the invention there is provided a computer readable medium carrying a computer program comprising program code means for performing the steps of the method of the example embodiments, when said program product is run on a computer.

Effects and features of this fourth aspect of the invention are largely analogous to those described above in relation to the other aspects of the present invention.

According to a fifth aspect of the invention there is provided a vehicle speed controller for operating a vehicle, the vehicle speed controller being configured to perform the steps of the method according to any one of the example embodiments.

Effects and features of this fifth aspect of the invention are largely analogous to those described above in relation to the other aspects of the present invention.

By the term "creep speed" as mentioned herein typically refers to that the vehicle is operated at low speed or very low speed. As an example, creep speed may refer to a speed of the vehicle corresponding to a low speed range between 0-20 km/h. Thus, it should be readily appreciated that the system and method according to example embodiments herein is configured to control the vehicle at a creep speed. To this end, the system and method provides a means for improved creep control at low speeds. In other words, the system and the method allows the vehicle to be controlled so that the vehicle can be operated in an improved manner when it is desired to drive the vehicle at a desired creep speed.

By the term "drivingly connected" typically means that a first component is connected to a second component in a manner allowing a transfer of a rotational movement and/or rotational torque from the first component to the second component. Therefore, the term encompasses a functional construction in which two components are connected such that the rotational speed of the first component corresponds to the rotational speed of the second component. However, the term also encompasses a functional construction in which there is a ratio between the rotational movement of the first component and the rotational movement of the second component, i.e., the rotational speed of the second component is proportional to the rotational speed of the first component.

By the term "operatively connected" or "operatively driven" means that a component is in operative relation to another component, e.g. the provision that the first clutch is operatively connected to the sub-transmission means that the clutch is in operative relation with the sub-transmission.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
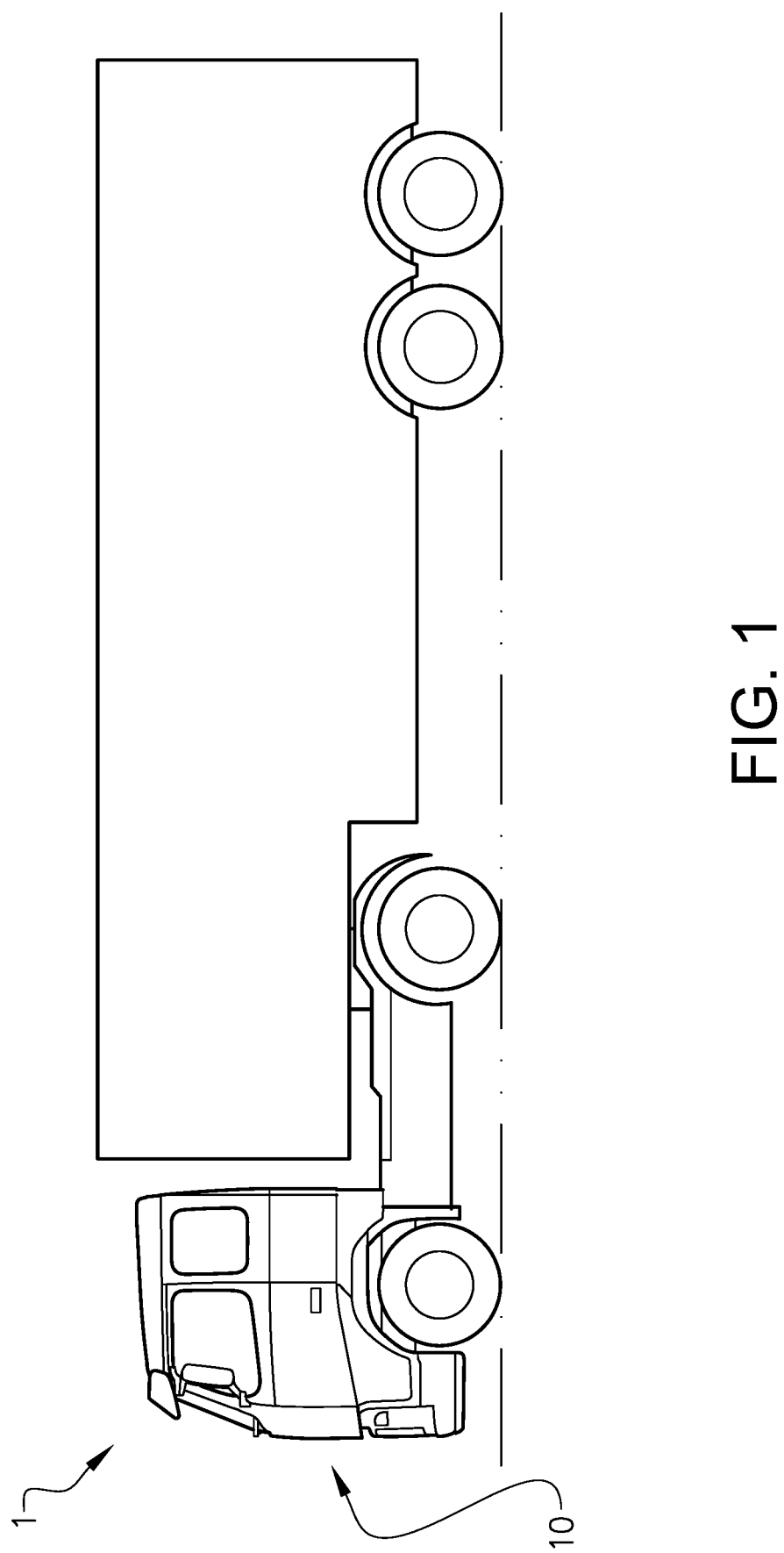
FIG. 1 is a side view of a vehicle including a vehicle speed control system according to an example embodiment of the present invention.

The present invention will now be described more fully hereinafter with reference to the accompanying drawings, in which exemplary embodiments of the invention are shown. The invention may, however, be embodied in many different forms and should not be construed as limited to the embodiment set forth herein; rather, these embodiments are provided for thoroughness and completeness. Like reference character refer to like elements throughout the description.

FIG. 1 is a side view of a vehicle 1. The vehicle includes a vehicle speed control system 10 according to an example embodiment of the present invention. The vehicle speed control system 10 and some installations of further example components in a vehicle are described in further detail with reference to FIGS. 2a-2g, 3a-3b, 4a-4d. In addition, some examples on suitable applications of the example embodiments are described in relation to FIGS. 4a-4d.

For sake of facilitating the understanding of some example embodiments of the invention, the example of the vehicle 1 in FIG. 1 is here illustrated in the form of a truck, and the following example embodiments of the invention are described based on an exemplary truck to illustrate the configuration of vehicle speed control system 10 and the method of the invention. In addition, the truck here includes a trailer. However, such does not mean that the invention will be limited to an installation of the vehicle speed control system and the method in a truck. In contrary, the vehicle may be a car, industrial construction machine, wheel loader or the like.

Figure 2A:
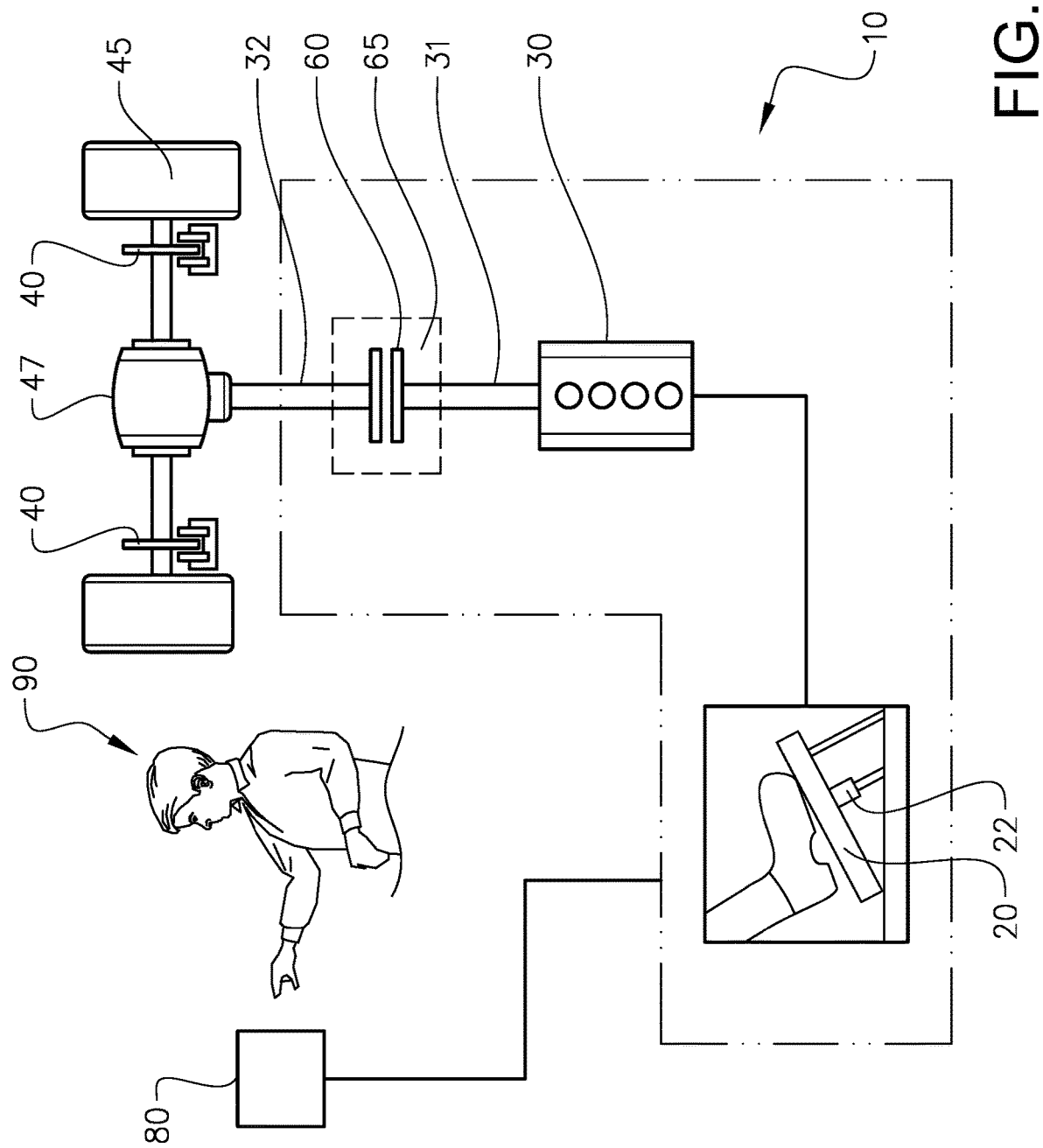
FIG. 2a schematically illustrates a vehicle speed control system according to an example embodiment of the present invention.

Turning now to FIG. 2a, there is depicted a vehicle speed control system according to an example embodiment of the present invention. In this example embodiment, the vehicle also comprises a propulsion unit 30 for powering the vehicle 1, a clutch unit 60 for transmitting a rotational torque from the propulsion unit 30 to a driven shaft 32 and a service brake unit 40 for braking the vehicle.

The propulsion unit 30 is any one of an internal combustion engine, electric engine, and a hydraulic machine. In the illustrated example embodiment, the propulsion unit is however an internal combustion engine. The internal combustion engine can work, for instance, according to the four-stroke and/or two-stroke principle; however, additional modes of operation can exist. The combustion engine may be a compression ignition, spark ignition engine or a piston compressor. The internal combustion engine in FIG. 2a is designed to work according to the diesel process. Since the components of an internal combustion engine are well-known, and the function and configuration of the engine can vary dependent on the type of vehicle, only a brief introduction of the engine is given above for the sake of a better understanding on how the example embodiments of the invention can be installed in an internal combustion engine of a vehicle, such as a truck.

It is to be noted that the example embodiments of the invention may also include several supplementary propulsion units, such as a supplementary electric engine and/or a hydraulic machine/motor. In other example embodiments, the vehicle may only include one propulsion unit in the form of an internal combustion engine, an electric engine, or a hydraulic machine.

In one example embodiment, in which the vehicle comprises an internal combustion engine as the propulsion unit and a hydraulic machine as a supplementary engine, the hydraulic machine may be arranged in a hub located in any one of the wheels of the vehicle (not shown).

As an example, the vehicle (truck) may have one or several front axles provided with steerable wheels whereof at least one pair of wheels has been provided with a hydraulic motor. The motors may for example be hub motors rotating with the wheels and thus having a rotating housing. The hydraulic motors are typically configured for being decoupled so that the hydraulic traction is used only when desired, e.g. at low speeds on loose or muddy ground. The hydraulic motors may have a variable or fixed displacement. The hydraulic motors may form part of a hydraulic system and thus being powered by a hydraulic pump. The hydraulic pump may be a pump having a variable displacement which can be controlled to deliver the hydraulic liquid at a desired flow rate or pressure. The pump is typically driven by the internal combustion engine which is used as a power source for the mechanical drive of the pair of wheels 45 and may be connected to a Power Take-Off (PTO) on the engine.

In another example embodiment, the vehicle comprises an internal combustion engine as the propulsion unit and a supplementary electric motor. Accordingly, it is to be noted that the propulsion unit and the type of drive of the vehicle can be provided in several different ways, and may thus be selected according to the desired system, purpose, installation and type of vehicle.

In addition, the vehicle here is provided with a transmission arrangement 65 such as an automated manual transmission (AMT), for transmitting torque to the vehicle driven shaft 32. In other words, the vehicle 1 is typically provided with an internal combustion engine 30 operatively connected to the transmission arrangement, such as an automated manual transmission (AMT), for transmitting torque to the vehicle driven shaft 32.

The transmission arrangement 65 here includes the clutch unit 60 configured for transmitting the rotational torque from the internal combustion engine 30 to the driven shaft 32. However, it is also conceivable that the clutch unit 60 is a separate component of the system.

The clutch unit 60 may be a single clutch unit, a dual-clutch unit, as further described herein, or any other type of multi-clutch unit. Alternatively, the clutch unit 60 may be a hydraulic clutch unit, hydraulic converter or any other hydraulic unit suitable for the purpose and the various example embodiments of the invention.

Typically, although not strictly required, the propulsion unit 30 is operatively connected to the transmission arrangement 65 and the clutch unit 60 via an engine output shaft 31, as shown e.g. in FIG. 2a. Briefly, the engine output shaft transmits rotational motion from the propulsion unit 30 to the transmission arrangement 65 via engagement of the clutch unit. The transmission arrangement 65 is typically configured for transmitting the motion from the propulsion unit 30 via the engine output shaft to the driving shaft 32. Accordingly, the clutch unit 65 is typically arranged between the propulsion unit 30 and the transmission arrangement 65. In this context, the figures merely illustrate a schematic configuration of the components of the vehicle and it is to be noted that the clutch unit may not necessarily be arranged in the transmission arrangement as shown in the figures, but may in some example embodiments be arranged as a separate unit between the propulsion unit 30 and the transmission arrangement 65.

The internal combustion engine 30 may be connected to a radiator arrangement (not shown) for cooling engine coolant and oil from the internal combustion engine 30. Typically the transmission arrangement is controlled by the driver or automatically via an electronic control unit (ECU). The ECU may be provided with control algorithms for controlling the transmission independently during, for instance, an engine start requested by the driver.

As an example, the clutch unit 60 may be controlled to select a gear ratio between the internal combustion engine 30 and a pair of driven wheels 45. In some example embodiments, the clutch unit may be controlled to select a gear ratio between the internal combustion engine 30 and a pair of driven ground engagement elements in the form of continuous tracks, also denoted as caterpillar tracks. Thus, the vehicle typically includes pair-wise left and right ground engagement elements. The ground engagement elements may be provided in the form of wheels, caterpillar tracks or the like, depending on type of vehicle. As shown in FIG. 2a, the vehicle is here depicted with a pair of front wheels 45.

However, the vehicle typically also comprises at least an additional pair of wheel, although not shown in FIG. 2a.

In some example embodiments, the vehicle may include a differential function 47 arranged in-between the pair of driven wheels 45 and the transmission arrangement 65.

With regard to the service brake unit 40, it is to be noted that the service brake unit may be a wet brake type or a dry brake type. In a wet brake type, the disks that act on the wheels are typically arranged in a closed environment filled with a liquid such as oil. In a dry brake type, a brake calliper and brake pads may act on the wheels, and typically being surrounded by air. The service brake unit is typically configured for performing a brake function. In addition, the service brake unit is typically configured to be controlled by the vehicle speed controller to maintain a constant speed of the vehicle. As an example, the service brake unit may be a wheel brake. In addition, a service brake unit may be provided for each wheel 45. It is to be noted that there are several different types of service brake units available in the art. However, since these types of units are well-known, no further details are given herein.

As shown in FIG. 2a, the vehicle speed control system 10 comprises a vehicle accelerator mechanism 20 manually moveable between a plurality of positions, detection means 22 configured to detect the position of the vehicle accelerator mechanism 20 and to generate an output signal O indicative of the position of the vehicle accelerator mechanism 20, and a vehicle speed controller 80 configured to establish a speed of the vehicle as a function of the detected position of the manually controllable vehicle accelerator mechanism 20, and to use the output signal O as an input speed control signal I.

The vehicle accelerator mechanism 20 is typically an accelerator pedal, as is well-known in the art. Thus, the vehicle accelerator mechanism is configured for being moveable between a plurality of positions upon a force exerted by the driver, typically by the foot of the driver.

The detection means 22 is typically a sensor configured for reading a position of the vehicle accelerator mechanism 20. As an example, the detection means may be an angle sensor, such as an actuation angle sensor configured to measure a deflection angle of the accelerator pedal (vehicle accelerator mechanism 20). Optionally, although not strictly required, the detection means 22 is arranged on the vehicle accelerator mechanism, thereby being arranged to measure a deflection angle of the accelerator pedal (accelerator mechanism 20).

Accordingly, the detection means 22 is capable of detecting the position of the vehicle accelerator mechanism 20 so as to generate an output signal O indicative of the position of the vehicle accelerator mechanism 20. The output signal is thereafter transmitted to the vehicle speed controller 80, which is configured to establish a speed of the vehicle as a function of the detected position of the manually controllable vehicle accelerator mechanism 20. To this end, the vehicle speed controller is configured to use the output signal O from the detection means 22 as an input speed control signal I. In addition, the signal is typically transmitted from the detection means 22 to the vehicle speed controller by a CAN bus.

Moreover, the vehicle speed controller 80 is configured to be operably activated by a user 90. Further, the vehicle speed controller 80 is configured to operate any one of the clutch unit 60, propulsion unit 30 and service brake 40. Thereby, when the vehicle speed controller 80 is operably activated by the user to use the output signal O as an input speed control signal I, the vehicle speed controller 80 is further configured to be operated by the user to control the speed of the vehicle 1 by an operation of any one of the clutch unit, the propulsion unit and the service brake. To this end, the user is allowed to manually control the speed of the vehicle as a function of the position of the vehicle accelerator mechanism 20.

In order to further describe an example embodiment of the invention, as shown in FIG. 2a, the followings include the operations and configurations of the vehicle speed controller when used in combination with a clutch unit in the form of a dual clutch assembly. In this example embodiment, the internal combustion engine (propulsion unit 30) has an output shaft 31 that is connected to the transmission arrangement 65. The transmission arrangement here comprises a dual clutch assembly 60. A dual-clutch assembly, which may also be denoted a dual-clutch transmission (DCT) (sometimes also referred to as a twin-clutch gearbox or double-clutch transmission), is a type of semi-automatic or automated manual automotive transmission. It may be structurally described as two separate manual transmissions working as one unit. It is to be noted that the structural elements of a dual-clutch assembly are well-known to the skilled person, but typically it refers to a transmission arrangement that is configured to dispose a first clutch and a second clutch at the front thereof so as to continue to be selectively operated, thereby reducing the speed change time. In principle, the dual-clutch assembly uses two separate clutches, i.e. the first clutch and the second clutch for an odd gear set and an even gear set, respectively. The dual-clutch assembly thereby splits up odd and even gears on two shafts and two clutches. Each clutch may therefore be considered as a separate torque-transmitting unit. Various clutches may be used in a dual-clutch assembly. As an example, the clutch can be provided in the form of a dry friction clutch, i.e. dry single-plate clutches. However, any type of clutch is conceivable such as wet multi-plate clutches. One advantage with using the example embodiments of the invention together with a dual-clutch assembly is that the vehicle speed controller can operate the clutch unit to sequentially engage each one of the first clutch and the second clutch, thus not consistently using one clutch. This may have a positive impact on the service life of the clutch unit compared to using a single clutch unit.

Dual clutch transmissions provide operating characteristics which can combine those of both conventional automatic planetary transmissions and manual transmissions. An advantageous characteristic is the power-shift function, which allows gear shifts with uninterrupted torque transfer to suitable ground engaging elements, such as driving wheels or tracks. Dual clutch transmissions also exhibit good fuel economy due to their good gear mesh efficiency, ratio selection flexibility and reduced clutch wear.

In other words, the dual clutch assembly has a first and a second clutch, respectively. The first clutch is typically controlled by an electronic control unit (not shown) to connect a crankshaft to a first gearbox unit, comprising a first input shaft, an output shaft and a number of gears (not shown) that can be actuated for controlling the gear ratio between the engine 30 and the driven wheels 45. Similarly, the second clutch can be controlled to connect the crankshaft to a second gearbox unit, comprising a second input shaft, an output shaft and a number of gears (not shown) that can be actuated for controlling said gear ratio.

The mechanical design of the first and second gearbox units is not part of the invention per se and will thus not be described in further detail. Using the first and a second clutches in turn, the gears of the first and second gearbox units can be used for driving the wheels 45 via the drive shaft 32. There may be parts, e.g., gearwheels, which are used in both the first and second gearbox units. Typically, the lowest gear of the available set of gears is activated by the first clutch, while a higher gear is prepared by the second clutch. The second clutch is thereafter engaged so as to activate a different gear.

A controllable first clutch is typically arranged to bring the output shaft of the engine and the first input shaft into engagement with each other. Similarly, a controllable second clutch is typically arranged to bring the output shaft of the engine and the second input shaft into engagement with each other. As mentioned above, an electronic control unit may be arranged to control gear selection and clutch unit actuation. The dual clutch assembly may be operated according to various pre-programmed parameters and/or conditions.

However, since the construction and the function of a clutch are well-known to the skilled person, no further description is given as to the arrangement of various gearwheels and/or how the gearwheels are locked to the different shafts.

The dual clutch assembly is operatively connected to the propulsion unit of the vehicle. The propulsion unit is here typically an internal combustion engine of a heavy road vehicle such as a truck, heavy truck, bus or the like. However, it will be readily appreciated that other engines and/or vehicles may be contemplated as described above.

Alternatively, a range gear (not shown) can be connected to the output shafts of the respective first and second gearbox units. In this example, the range gear can be a planetary gear, having a sun wheel driven by the respective transmission output shaft. The range gear is connected to the drive shaft 32 for driving the wheels 45.

The electronic control unit may be connected to a number of existing sensors (not shown) for detecting and monitoring the number of actuations performed by each clutch and into which gear. The degree and duration of actuation of each clutch is detected to allow calculation of clutch slip energy applied to each clutch.

In addition, the dual clutch assembly may include various valves, shift rods, shift forks, electronics and sensors as is evident to the person skilled in the art.

The operation of the dual clutch assembly 60 (clutch unit 60) is here controlled by vehicle speed controller 80 when activated by the user. Thereby, the vehicle speed controller 80 is configured to operate the dual clutch assembly. Analogously, the vehicle speed controller 80 is configured to operate the propulsion unit 30. Analogously, the vehicle speed controller is configured to operate the service brake unit 40. Typically, the vehicle speed controller comprises a computer program product. The computer program product includes a computer readable medium having stored thereon computer program means for causing the vehicle speed controller to control the operation of the clutch unit 60, the propulsion unit 30 and the service brake unit 40.

Typically, the control of the various units 30, 40 and 60 are performed via CAN bus, as is well-known in the art. Moreover, the computer program product comprises code for executing an operation or a method according to any one of the example embodiments as described hereinafter.

As mentioned above, the vehicle speed controller 80 is configured to establish a speed of the vehicle as a function of the detected position of the manually controllable vehicle accelerator mechanism 20, and to use the output signal O as an input speed control signal I.

Moreover, the vehicle speed controller 80 is configured to be operably activated by a user 90. Further, the vehicle speed controller 80 is configured to operate any one of the clutch unit 60, propulsion unit 30 and service brake 40. Thereby, when the vehicle speed controller 80 is operably activated by the user to use the output signal O as an input speed control signal I, the vehicle speed controller 80 is further configured to be operated by the user to control the speed of the vehicle 1 by an operation of any one of the clutch unit, the propulsion unit and the service brake. To this end, the user is allowed to manually control the speed of the vehicle as a function of the position of the vehicle accelerator mechanism 20.

Typically, although not strictly required, the vehicle speed controller 80 here comprises data reflecting vehicle speed rating as a function of the position of the vehicle accelerator mechanism 20. In this manner, the vehicle speed controller 80 is configured to operate any one of the clutch unit, the propulsion unit and the service brake based on the data to control the speed of the vehicle.

In this manner, the driver (or operator) of the vehicle can set a suitable vehicle speed rating as a function of the deflection angle of the vehicle accelerator mechanism, e.g. a vehicle speed rating extending between 0-5 km/h. As an example, the data reflecting the vehicle speed rating as a function of the position of the accelerator mechanism can be predetermined and/or programmed prior to use, either by the driver of the vehicle or by the manufacturer of the vehicle.

By allowing the driver to set a suitable vehicle speed rating as a function of the deflection angle of the vehicle accelerator mechanism, this example embodiment further contributes to improve the human-machine interaction, i.e. it allows for a comfortable and effective operation and control of the vehicle from the human end. In other words, by setting a suitable vehicle speed rating as a function of the deflection angle, the vehicle speed controller is configured to determine the ground speed of the vehicle based on the deflection angle. As is further used herein, the vehicle speed rating may also sometimes be denoted as a user-specific vehicle speed rating.

The data reflecting vehicle speed rating as a function of the position of the vehicle accelerator mechanism may e.g. be set by the manufacturer of the vehicle or the manufacturer of the vehicle speed controller. In addition, or alternatively, the data reflecting vehicle speed rating as a function of the position of the vehicle accelerator mechanism may be set by the driver or the operator of the vehicle prior to operating the vehicle. In addition, or alternatively, the data reflecting vehicle speed rating as a function of the position of the vehicle accelerator mechanism may be set by the driver or the operator of the vehicle during operation of the vehicle.

Accordingly, in some example embodiments, as shown in FIGS. 2b-2g, the data reflecting vehicle speed rating as a function of the position of the vehicle accelerator mechanism may be set by the driver or the operator of the vehicle via a user interface 82.

Hence, the vehicle speed controller 80 here comprises a user interface 82 for receiving user-specific data and configured to permit the user to set a user-specific vehicle speed rating as a function of the position of the vehicle accelerator mechanism 20.

In addition, the user may operate the vehicle speed control system by the user interface. That is, the user may activate the vehicle speed controller function via the user interface. In addition, the user may operate any one of the clutch unit 60, propulsion unit 30 and service brake 40 via the user interface 82.

In this example embodiment, the vehicle speed controller 80 comprises the user interface 82. However, in other example embodiments, the user interface may be a separate part of the vehicle speed control system, wherein the user interface is connected to the vehicle speed controller 80 so as to control the activation and operation of the vehicle speed controller.

However, it should be readily appreciated that the vehicle speed controller may be activated and operated in several different ways, as e.g. described in relation to the FIGS. 2*b*-2*g*.

In other words, the vehicle speed controller 80 can be configured to be operably activated by a user 90 by any suitable user-activated means. Further, the vehicle speed controller 80 can be configured to operate any one of the clutch unit 60, propulsion unit 30 and service brake 40 by any suitable user-operated means via the vehicle speed controller 80. Thus, the activation configuration and the operation configuration of the vehicle speed controller is typically selected depending on the purpose, installation and type of vehicle.

Optional, although not strictly necessary, the vehicle speed controller 80 may further be configured to permit the user to set a user-specific vehicle acceleration and retardation rating as a function of the position change per time unit of the vehicle accelerator mechanism 20. In this context, it is to be noted that the position change per time unit of the vehicle accelerator mechanism typically refers to mm/s$^2$ or α/s$^2$.

In this manner, the rate of change of the speed of the vehicle as a response to the deflection of the accelerator mechanism can be set according to the driver's (user's) wishes. The rate of change of the speed of the vehicle is typically defined and set under varying circumstances by the driver (user). This type of configuration of the vehicle speed controller may typically correspond to a ramp function. The ramp function may comprise a substantially linear function. In addition, or alternatively, the ramp function may comprise a substantially non-linear function. Ramp functions are well-known functions, and thus not further described herein.

By allowing the driver to set a user specific vehicle acceleration and retardation rating as a function of the position change per time unit of the vehicle accelerator mechanism, this example embodiment further improves the human-machine interaction between the driver and the vehicle so that the acceleration and retardation of the vehicle can be achieved at a controlled rate.

As mentioned above, the vehicle speed controller typically, although not strictly necessary, includes a user interface for receiving user-specific data, which may further be configured to permit the user to set a user-specific vehicle acceleration and retardation rating as a function of the position change per time unit of the vehicle accelerator mechanism.

With regard to the configuration of the vehicle accelerator mechanism and the measuring of the position of the vehicle accelerator mechanism, it is to be noted that there are several different possibilities for configuring the system so as to provide an efficient control of the vehicle speed based on the detected position of the vehicle accelerator mechanism.

As an example, a swivel range of the vehicle accelerator mechanism 20, as defined by the plurality of the positions of vehicle accelerator mechanism 20, may correspond to a vehicle speed range between 0-20 km/h. This speed range may sometimes also be referred to as the creep speed, which typically refers to that the vehicle is operated at low speed or very low speed.

Still preferably, a swivel range of the vehicle accelerator mechanism, as defined by the plurality of the positions of vehicle accelerator mechanism, may correspond to a vehicle speed range between 0-10 km/h. Still preferably, a swivel range of the vehicle accelerator mechanism, as defined by the plurality of the positions of vehicle accelerator mechanism, may correspond to a vehicle speed range between 0-5 km/h.

In addition, or alternatively, a swivel range of the vehicle accelerator mechanism, as defined by the plurality of the positions of vehicle accelerator mechanism, may be defined so that a maximum vehicle speed is less than 20 km/h.

In another example embodiment, a first part of a swivel range of the vehicle accelerator mechanism 20, as defined by the plurality of the positions of vehicle accelerator mechanism 20, corresponds to a low speed range of 0-5 km/h, wherein the vehicle speed controller 80 is further configured to disable the activation of manually controlling the speed of vehicle as a function of the position of the vehicle accelerator mechanism if the vehicle accelerator mechanism 20 is moved into a position outside the first part of the swivel range.

The speed of the vehicle can be measured and monitored by various means, such as GPS, Doppler radar, image processing or via an accelerometer. Hence, the vehicle speed controller 80 is typically, although not strictly necessary, configured to establish a speed of the vehicle as a function of the detected position of the manual vehicle accelerator mechanism 20 by measuring the speed of the vehicle by means of GPS, Doppler radar, image processing or an accelerometer.

Optionally, although not strictly necessary, the vehicle speed controller may further be configured to control the steering force based on the ground speed of the vehicle. In this manner, it becomes possible to further improve handling and ride comfort in certain situations, e.g. when cornering, changing lanes or parking. Typically, the control of the steering force is achieved by operating an electric motor attached to the steering shaft, wherein the electric motor is cooperating with a hydraulic power steering system of the vehicle. Accordingly, in one example embodiment (not shown), the vehicle speed controller is further configured to control the steering force of the vehicle upon activation of the vehicle speed controller by the user, as described herein.

Optionally, although not strictly necessary, the vehicle speed controller is further configured to control the steering ratio based on the ground speed of the vehicle. In this manner, it becomes possible to further improve handling and ride comfort for certain situations, e.g. when cornering, changing lanes or parking. To this end, the vehicle speed controller may be configured to vary the steering ratio so that the steering ratio is increased at low speeds. The function of controlling the steering ratio is particularly applicable to a steer by wire system of a vehicle. Typically, the control of the steering ratio is achieved by controlling the electronic control system of the steer by wire system. Accordingly, in one example embodiment, the vehicle speed controller is further configured to control the steering ratio of the vehicle upon activation of the vehicle speed controller by the user.

As mentioned above, the function of the vehicle speed controller 80 to use said output signal as an input control speed signal may be operably activated by the user via any one of a cruise control unit 92, a gear shift member 94, an interior vehicle user-interface 95, a remote control unit 96, and a voice control unit 98.

In addition, the operation of any one of the clutch unit, the propulsion unit and the service brake via the vehicle speed controller 80 may be operable by the user via the cruise control unit 92, the gear shift member 94, the interior vehicle user-interface 95, the remote control unit 96, and the voice control unit 98.

Turning now to the FIG. 2b-2g, there are depicted some examples on configurations as to how the vehicle speed controller may be activated and operated during driving of the vehicle. In other words, FIGS. 2b-2g schematically illustrate various examples on user-interfaces for operating a vehicle speed control system to an example embodiment of the present invention.

Figure 2B:
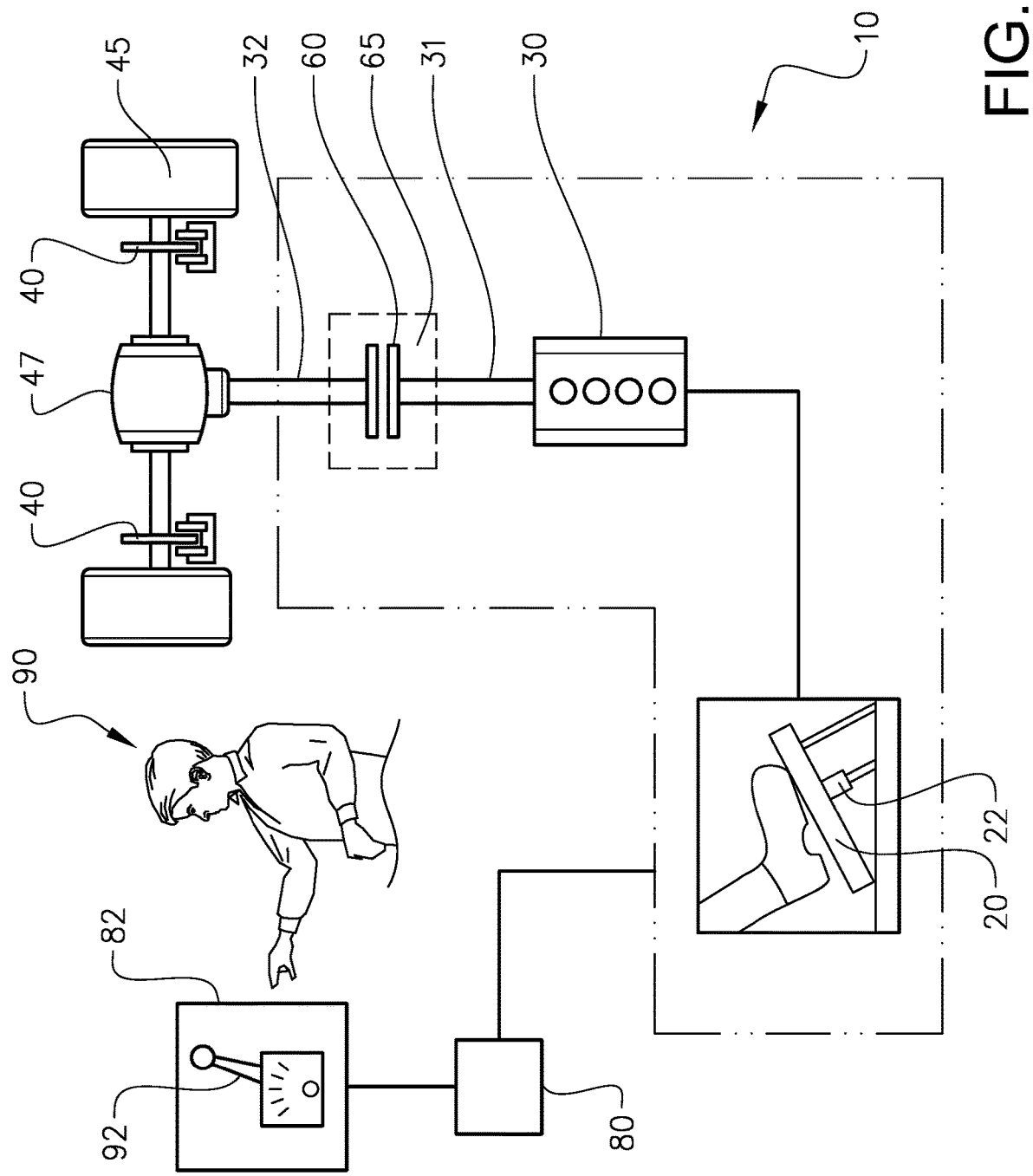
FIGS. 2b-2g schematically illustrate various examples on user-interfaces for operating a vehicle speed control system to an example embodiment of the present invention.

In FIG. 2b, there is provided a cruise control unit 92 typically configured for providing cruise control means as is well-known in the art. In addition, the cruise control is here also configured for controlling the vehicle speed controller 80. As an example, the cruise control unit 92 may also comprise a user-interface 82 for receiving user-specific data and configured to permit the user to set a user-specific vehicle speed rating as a function of the position of the vehicle accelerator mechanism 20.

As shown in FIG. 2b, the cruise control unit is here provided in the form of a lever. However, the cruise control unit may also be provided in other ways, such as in the form of one or several buttons.

Typically, the user may operate the vehicle speed controller 80 by the cruise control unit 92. That is, the user may activate the vehicle speed controller via the cruise control unit 92. To this end, the cruise control unit 92 is configured to activate the function of the vehicle speed controller 80 to use the output signal as an input control speed signal by an operation of the user.

In addition, the user may operate any one of the clutch unit 60, propulsion unit 30 and service brake 40 via the cruise control unit 92.

In a configuration wherein the cruise control unit also comprises the user interface, the user may operate the vehicle speed controller 80 by the user interface. That is, the user may activate the vehicle speed controller function via the user interface. In addition, the user may operate any one of the clutch unit 60, propulsion unit 30 and service brake 40 via the user interface 82.

To this end, the cruise control unit is configured to control the operation of any one of the clutch unit, the propulsion unit and the service brake via the vehicle speed controller 80 upon an operation by the user of the cruise control unit 92.

Accordingly, the vehicle speed control system 10 in this example embodiment comprises a cruise control unit 92 configured for activating and operating the vehicle speed controller 80 as mentioned above. Thereby, when the vehicle speed controller 80 is operably activated by the user via the cruise control unit 92 to use the output signal O as an input speed control signal I, the vehicle speed controller 80 is further operated by the user via the cruise control unit 92 to control the speed of the vehicle 1 by an operation of any one of the clutch unit, the propulsion unit and the service brake. To this end, the user is allowed to manually control the speed of the vehicle as a function of the position of the vehicle accelerator mechanism 20.

Besides this difference between the example embodiment in FIG. 2b and the example embodiment in FIG. 2a, the example embodiment in FIG. 2b may incorporate any one of the features and/or effects as described for the example embodiment in relation to FIG. 2a.

Figure 2C:
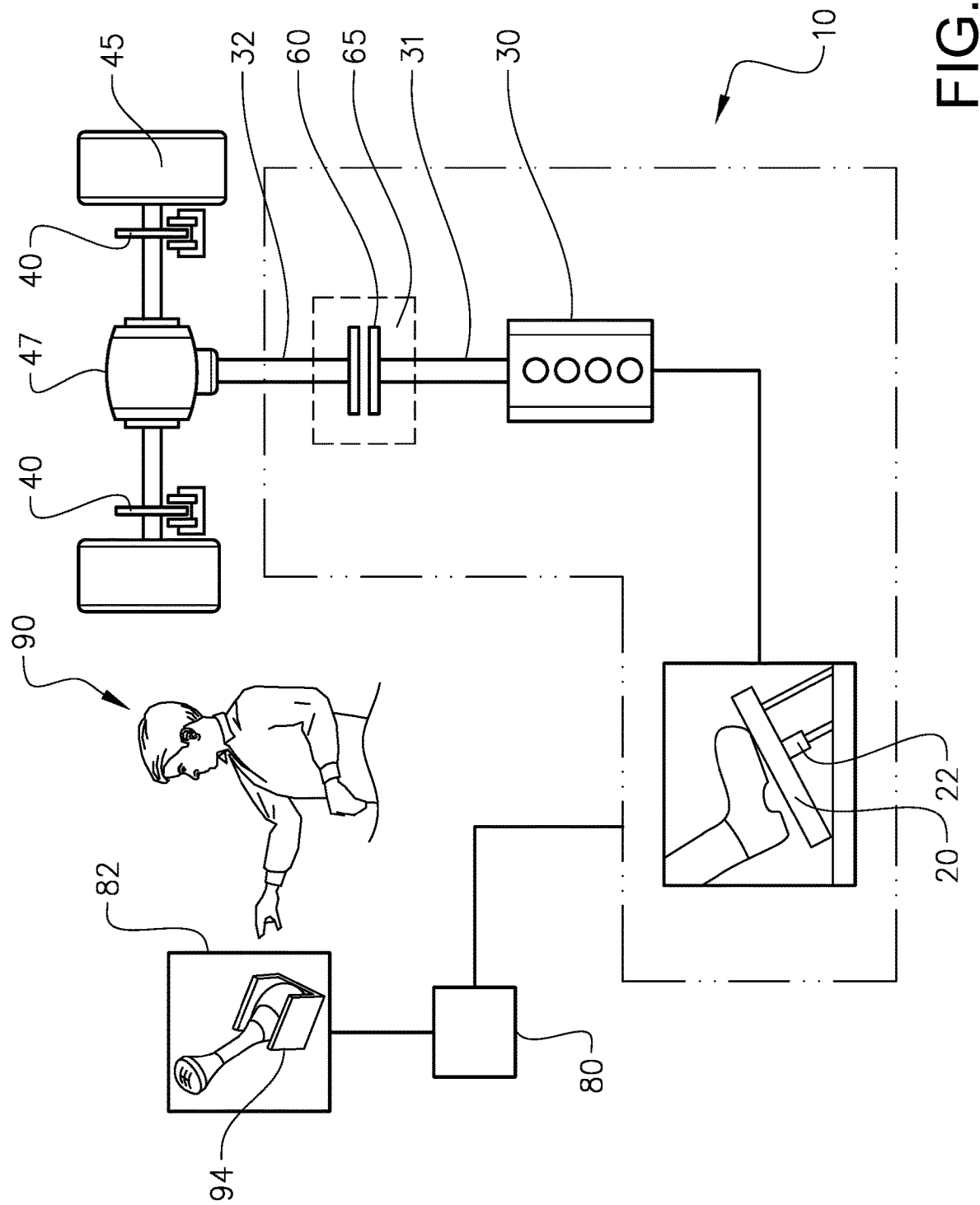

In FIG. 2c, there is provided a gear shift member 94 typically configured for performing conventional gear shifting of the vehicle as is well-known in the art. In addition, the gear shift member 94 here also comprises a means, such as a button or an additional lever member configured for controlling the vehicle speed controller 80. In addition, or alternatively, the gear shift member 94 may also comprise a user-interface 82 for receiving user-specific data and configured to permit the user to set a user-specific vehicle speed rating as a function of the position of the vehicle accelerator mechanism 20.

As shown in FIG. 2c, the gear shift member 94 is here provided in the form of a lever.

Typically, the user may operate the vehicle speed controller 80 by the gear shift member 94. That is, the user may activate the vehicle speed controller via the gear shift member 94. To this end, the gear shift member 94 is configured to activate the function of the vehicle speed controller 80 to use the output signal as an input control speed signal by an operation of the user.

In addition, the user may operate any one of the clutch unit 60, propulsion unit 30 and service brake 40 via the gear shift member 94.

In a configuration wherein the gear shift member 94 also comprises the user interface, the user may operate the vehicle speed controller 80 by the user interface. That is, the user may activate the vehicle speed controller function via the user interface. In addition, the user may operate any one of the clutch unit 60, propulsion unit 30 and service brake 40 via the user interface 82.

To this end, the gear shift member 94 is configured to control the operation of any one of the clutch unit, the propulsion unit and the service brake via the vehicle speed controller 80 upon an operation by the user of the gear shift member 94.

Accordingly, the vehicle speed control system 10 in this example embodiment comprises a gear shift member 94 configured for activating and operating the vehicle speed controller 80 as mentioned above. Thereby, when the vehicle speed controller 80 is operably activated by the user via the gear shift member 94 to use the output signal O as an input speed control signal I, the vehicle speed controller 80 is further operated by the user via the gear shift member 94 to control the speed of the vehicle 1 by an operation of any one of the clutch unit, the propulsion unit and the service brake. To this end, the user is allowed to manually control the speed of the vehicle as a function of the position of the vehicle accelerator mechanism 20.

Besides this difference between the example embodiment in FIG. 2c and the example embodiment in FIG. 2a, the example embodiment in FIG. 2c may incorporate any one of the features and/or effects as described for the example embodiment in relation to FIG. 2a.

Figure 2D:
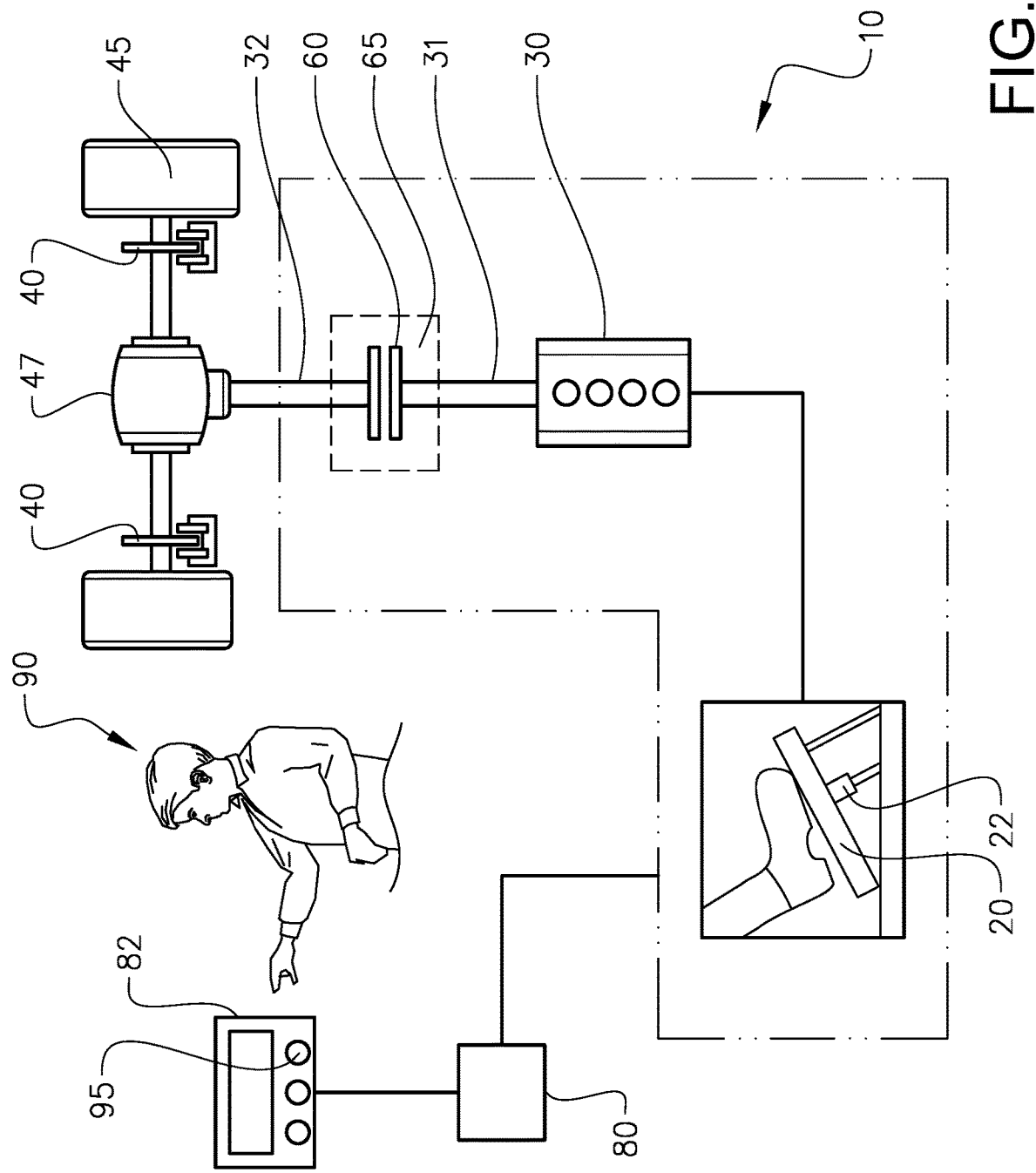

In FIG. 2d, there is provided an interior vehicle user-interface 95 for allowing the user to control various sub-operations of the vehicle, such as media, radio, mobile, ventilation, or heating adjustments. In addition, the interior vehicle user-interface 95 here also comprises a means for controlling the vehicle speed controller 80. In addition, or alternatively, the interior vehicle user-interface 95 may also comprise a user-interface 82 for receiving user-specific data and configured to permit the user to set a user-specific vehicle speed rating as a function of the position of the vehicle accelerator mechanism 20.

As shown in FIG. 2d, the interior vehicle user-interface 95 is here provided with a screen and a set of control knobs.

Typically, the user may operate the vehicle speed controller 80 by the interior vehicle user-interface 95. That is, the user may activate the vehicle speed controller via the interior vehicle user-interface 95. To this end, the interior vehicle user-interface 95 is configured to activate the function of the vehicle speed controller 80 to use the output signal as an input control speed signal by an operation of the user.

In addition, the user may operate any one of the clutch unit 60, propulsion unit 30 and service brake 40 via the interior vehicle user-interface 95.

To this end, the interior vehicle user-interface 95 is configured to control the operation of any one of the clutch unit, the propulsion unit and the service brake via the vehicle speed controller 80 upon an operation by the user of the interior vehicle user-interface 95.

Accordingly, the vehicle speed control system 10 in this example embodiment comprises an interior vehicle user-interface 95 configured for activating and operating the vehicle speed controller 80 as mentioned above. Thereby, when the vehicle speed controller 80 is operably activated by the user via the interior vehicle user-interface 95 to use the output signal O as an input speed control signal I, the vehicle speed controller 80 is further operated by the user via the interior vehicle user-interface 95 to control the speed of the vehicle 1 by an operation of any one of the clutch unit, the propulsion unit and the service brake. To this end, the user is allowed to manually control the speed of the vehicle as a function of the position of the vehicle accelerator mechanism 20.

Besides this difference between the example embodiment in FIG. 2d and the example embodiment in FIG. 2a, the example embodiment in FIG. 2d may incorporate any one of the features and/or effects as described for the example embodiment in relation to FIG. 2a.

Figure 2E:
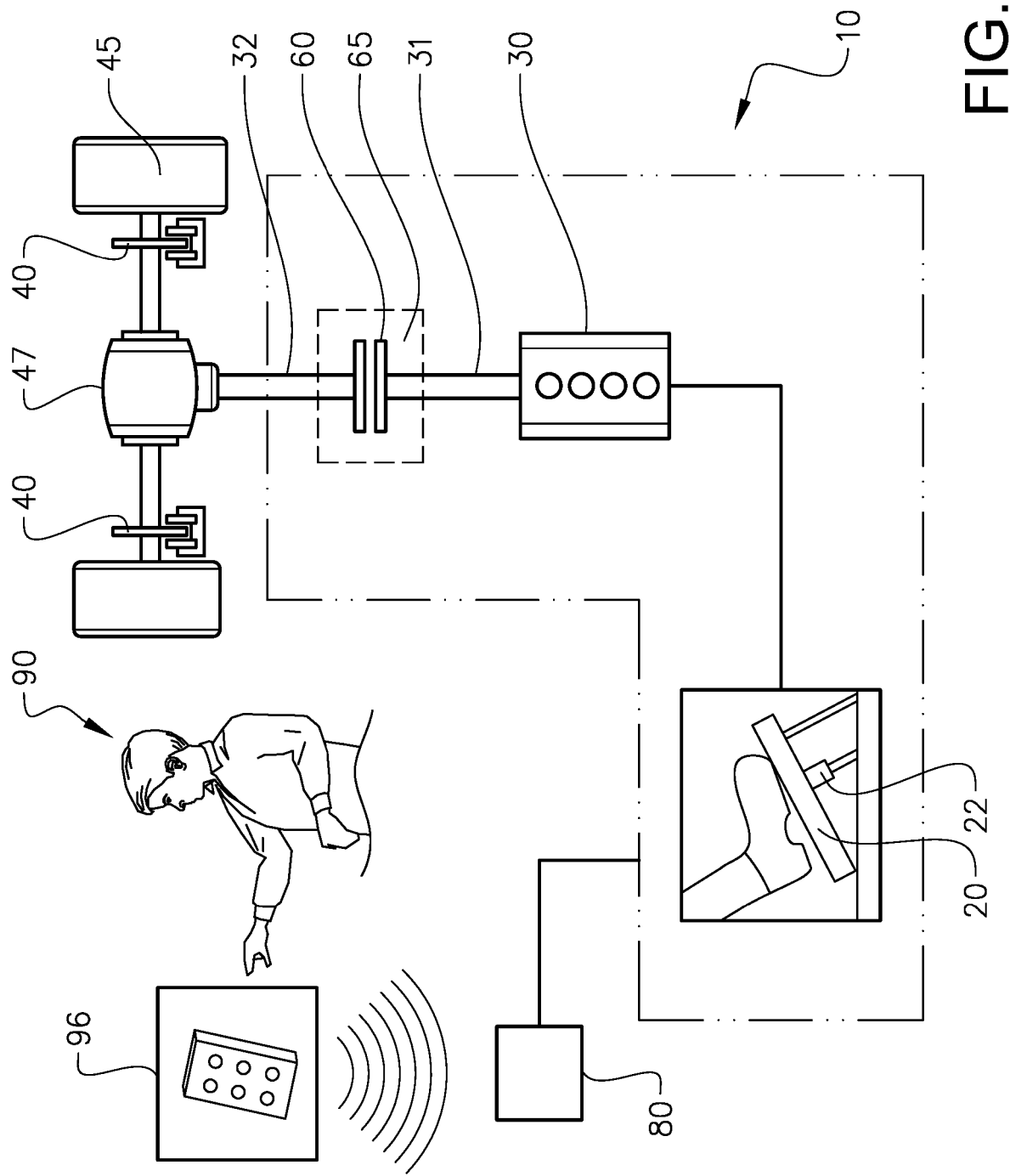

In FIG. 2e, there is provided a remote control unit 96 for allowing the user to control the vehicle and/or various sub-operations of the vehicle remote from the vehicle. The remote control unit may thus be a separate part designed to be carried by the user when leaving the vehicle. As an example, the remote control unit 96 is a portable remote control unit 96. Alternatively, the remote control unit 96 may be arranged at location remote from the vehicle. In this example embodiment, as shown in FIG. 2e, the remote control unit 96 is configured for communicating with vehicle speed controller. Typically, the remote control unit 96 is configured to communicate with the vehicle speed controller 80 by means of wireless technology, radio frequency or the like. However, other means for communicating with the vehicle speed controller 80 is also conceivable. In addition, the remote control unit 96 here also comprises means for controlling the vehicle speed controller 80. In addition, or alternatively, the remote control unit 96 may also comprise a user-interface for receiving user-specific data and configured to permit the user to set a user-specific vehicle speed rating as a function of the position of the vehicle accelerator mechanism 20.

As shown in FIG. 2e, the remote control unit 96 is here provided in the form of a portable unit.

The remote control unit may include a processing circuitry, a microprocessor, microcontroller, programmable digital signal processor or another programmable device. The remote control unit may also, or instead, include an application specific integrated circuit, a programmable gate array or programmable array logic, a programmable logic device, or a digital signal processor. Where the remote control unit includes a programmable device such as the microprocessor, microcontroller or programmable digital signal processor mentioned above, the processor may further include computer executable code for controlling.

Typically, the user may operate the vehicle speed controller 80 by the remote control unit 96. That is, the user may activate the vehicle speed controller via the remote control unit 96. To this end, the remote control unit 96 is configured to activate the function of the vehicle speed controller 80 to use the output signal as an input control speed signal by an operation of the user.

In addition, the user may operate any one of the clutch unit 60, propulsion unit 30 and service brake 40 via the remote control unit 96.

To this end, the remote control unit 96 is configured to control the operation of any one of the clutch unit, the propulsion unit and the service brake via the vehicle speed controller 80 upon an operation by the user of the remote control unit 96.

Accordingly, the vehicle speed control system 10 in this example embodiment comprises the remote control unit 96 configured for activating and operating the vehicle speed controller 80 as mentioned above. Thereby, when the vehicle speed controller 80 is operably activated by the user via the remote control unit 96 to use the output signal O as an input speed control signal I, the vehicle speed controller 80 is further operated by the user via the remote control unit 96 to control the speed of the vehicle 1 by an operation of any one of the clutch unit, the propulsion unit and the service brake. To this end, the user is allowed to manually control the speed of the vehicle as a function of the position of the vehicle accelerator mechanism 20.

Besides this difference between the example embodiment in FIG. 2e and the example embodiment in FIG. 2a, the example embodiment in FIG. 2e may incorporate any one of the features and/or effects as described for the example embodiment in relation to FIG. 2a.

Figure 2F:
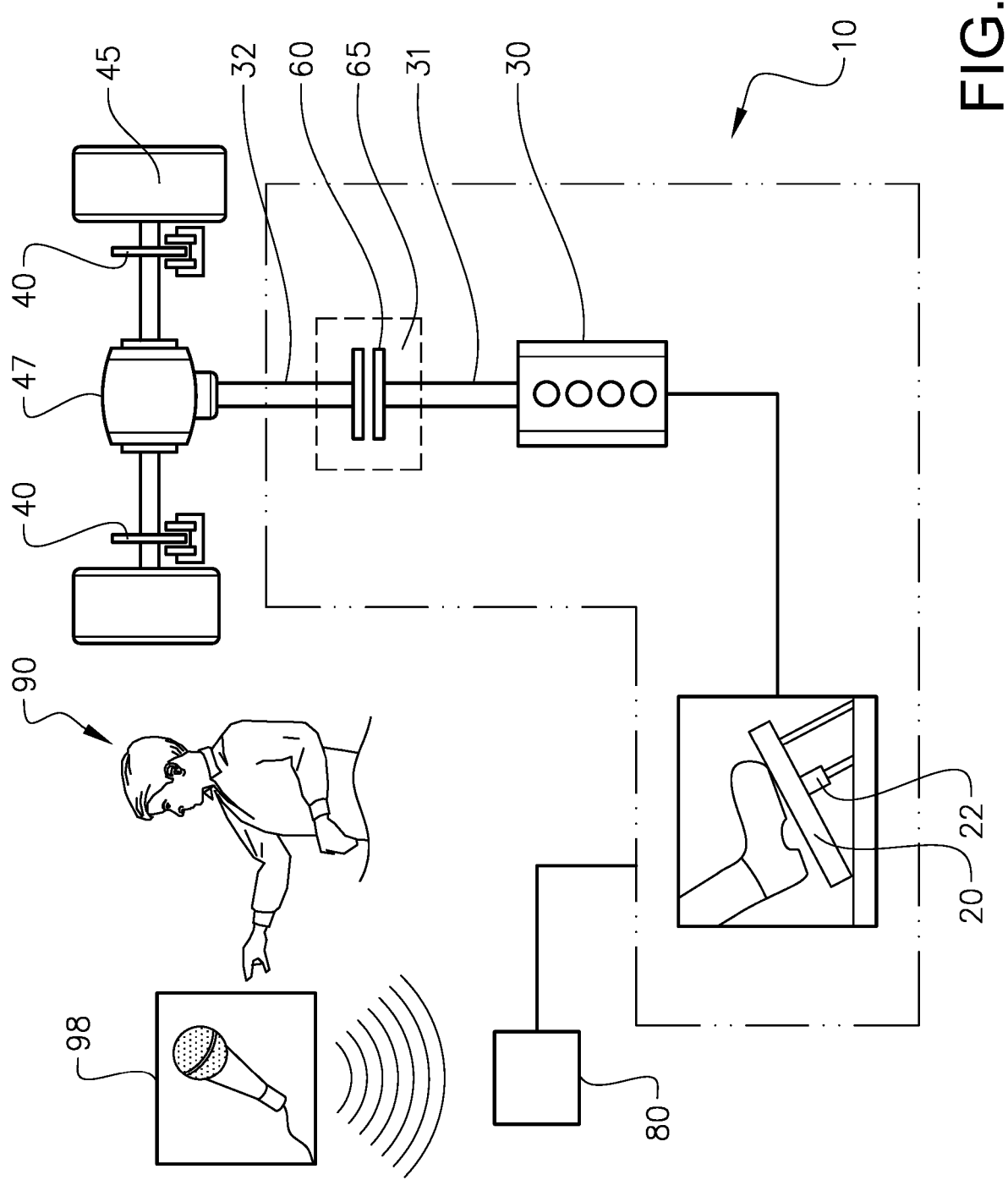

In FIG. 2f, there is provided a voice control unit 98 for allowing the user to control the vehicle and/or various sub-operations of the vehicle remote from the vehicle. The voice control unit 98 may be a remote voice control unit. Alternatively, the voice control unit 98 may be a unit arranged internal of the vehicle. Alternatively, the voice control unit 98 may be a wireless voice control unit 98 configured for being used both internal of the vehicle upon driving and remote from the vehicle as desired by the user. Thus, the voice control unit 98 may be a separate part designed to be carried by the user when leaving the vehicle. As an example, the voice control unit 98 is a portable voice control unit 98. In this example embodiment, as shown in FIG. 2f, the voice control unit 98 is configured for communicating with the vehicle speed controller via voice technology as is well-known in the art. The voice control unit 98 may typically, although not strictly necessary, be a microphone. However, other means for communicating with the vehicle speed controller 80 may also be conceivable. In addition, the voice control unit 98 here also comprises means for controlling the vehicle speed controller 80. In addition, or alternatively, the voice control unit 98 may also comprise a user-interface for receiving user-specific data and configured to permit the user to set a user-specific vehicle speed rating as a function of the position of the vehicle accelerator mechanism 20.

As shown in FIG. 2f, the voice control unit 98 is here provided in the form of a microphone.

The voice control unit may include a processing circuitry, a microprocessor, microcontroller, programmable digital signal processor or another programmable device. The voice control unit may also, or instead, include an application specific integrated circuit, a programmable gate array or programmable array logic, a programmable logic device, or a digital signal processor. Where the voice control unit includes a programmable device such as the microprocessor, microcontroller or programmable digital signal processor mentioned above, the processor may further include computer executable code for controlling.

Typically, the user may operate the vehicle speed controller 80 by the voice control unit 98. That is, the user may activate the vehicle speed controller via the voice control unit 98. To this end, the voice control unit 98 is configured to activate the function of the vehicle speed controller 80 to use the output signal as an input control speed signal by an operation of the user.

In addition, the user may operate any one of the clutch unit 60, propulsion unit 30 and service brake 40 via the voice control unit 98.

To this end, the voice control unit 98 is configured to control the operation of any one of the clutch unit, the propulsion unit and the service brake via the vehicle speed controller 80 upon an operation by the user of the voice control unit 98.

Accordingly, the vehicle speed control system 10 in this example embodiment comprises the voice control unit 98 configured for activating and operating the vehicle speed controller 80 as mentioned above. Thereby, when the vehicle speed controller 80 is operably activated by the user via the voice control unit 98 to use the output signal O as an input speed control signal I, the vehicle speed controller 80 is further operated by the user via the voice control unit 98 to control the speed of the vehicle 1 by an operation of any one of the clutch unit, the propulsion unit and the service brake. To this end, the user is allowed to manually control the speed of the vehicle as a function of the position of the vehicle accelerator mechanism 20.

Besides this difference between the example embodiment in FIG. 2f and the example embodiment in FIG. 2a, the example embodiment in FIG. 2f may incorporate any one of the features and/or effects as described for the example embodiment in relation to FIG. 2a.

Figure 2G:
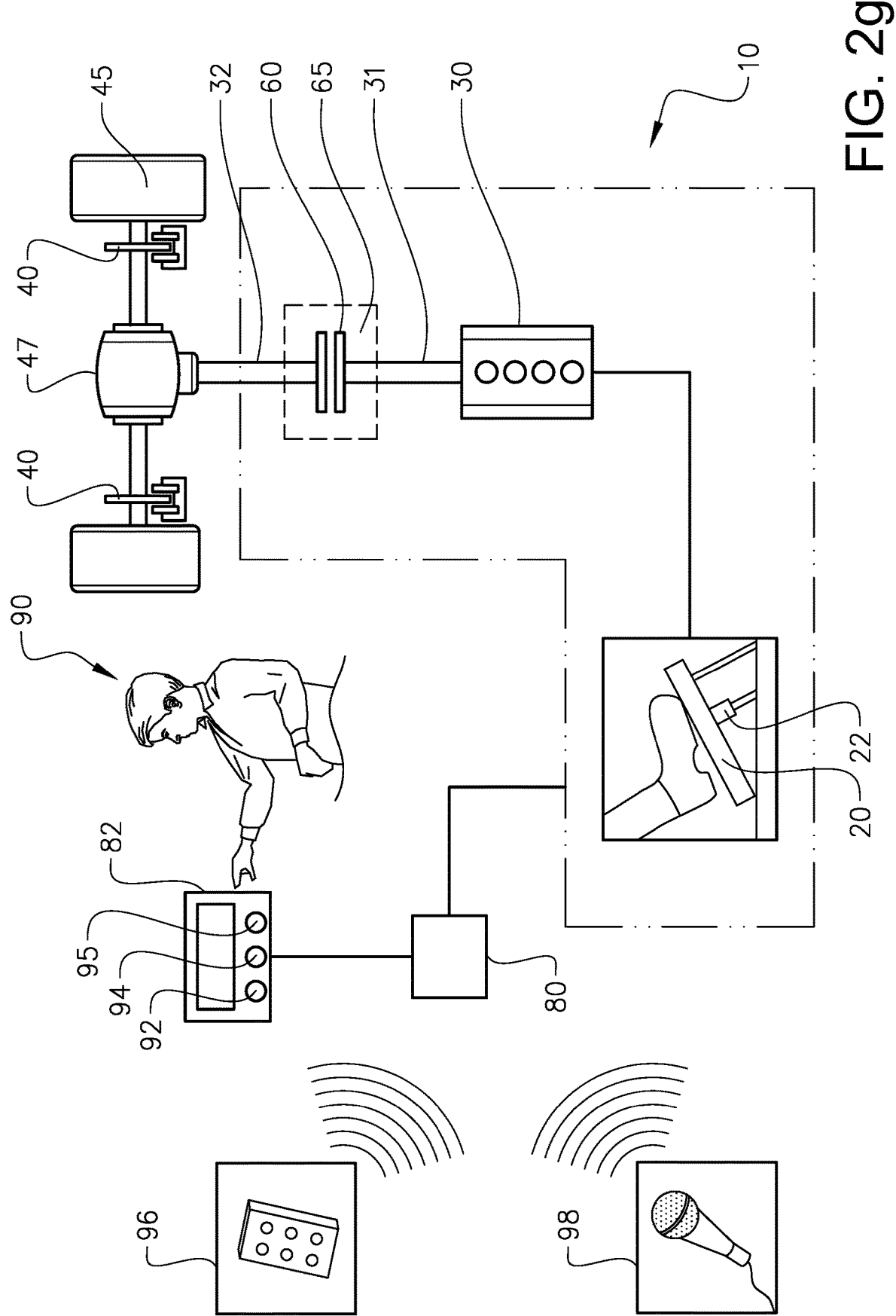

FIG. 2g further illustrates a combination of the example embodiments as described in relation to FIGS. 2b-2f, in which the function of the vehicle speed controller 80 to use the output signal as an input control speed signal may be operably activated by the user via any one of a cruise control unit 92, gear shift member 94, interior vehicle user-interface 95, remote control unit 96, voice control unit 98. In addition, the operation of any one of the clutch unit, the propulsion unit and the service brake via the vehicle speed controller 80 may be operable by the user via the cruise control unit 92, the gear shift member 94, the interior vehicle user-interface 95, the remote control unit 96, and the voice control unit 98.

Accordingly, as described in relation to the figures above, there is provided a vehicle 1 comprising a vehicle speed control system 10 which includes the vehicle accelerator mechanism 20 being manually moveable between a plurality of positions, the detection means 22 being configured to detect the position of the vehicle accelerator mechanism 20 and to generate an output signal O indicative of the position of the vehicle accelerator mechanism 20, the vehicle speed controller 80 being configured to establish a speed of the vehicle as a function of said detected position of said manually controllable vehicle accelerator mechanism 20, and to use said output signal O as an input speed control signal I. In addition, the vehicle speed controller 80 is further configured to be operably activated by the user 90 and to operate any one of the clutch unit 60, the propulsion unit 30 and the service brake 40, wherein, when the vehicle speed controller 80 is operably activated by the user to use the output signal O as an input speed control signal I, the vehicle speed controller 80 is further configured to be operated by the user to control the speed of the vehicle 1 by an operation of any one of the clutch unit, the propulsion unit and the service brake, allowing the user to manually control the speed of the vehicle as a function of the position of the vehicle accelerator mechanism 20.

As mentioned above, the vehicle here typically also comprising the propulsion unit 30 for powering the vehicle 1, the clutch unit 60 for transmitting a rotational torque from the propulsion unit 30 to the driven shaft 32 and the service brake unit 40 for braking the vehicle.

It should be noted that although the vehicle speed control system 10, the propulsion unit 30 for powering the vehicle 1, the clutch unit 60 for transmitting a rotational torque from the propulsion unit 30 to the driven shaft 32 and the service brake unit 40 for braking the vehicle are regarded as separate components of the vehicle, the components may sometimes also be included in a vehicle system which comprises the vehicle speed control system 10, the propulsion unit 30, the clutch unit 60, the propulsion unit 30, the driven shaft 32 and the service brake unit 40.

One example advantage of the example embodiments of the present invention, as described in relation to the various figures, is that a user-activated and user-operated vehicle speed control system can be provided, which allows for improved vehicle speed control at low speeds, or very low speeds by a manual control of the speed of the vehicle as a function of the position of the vehicle accelerator mechanism. By the provision of a system which comprises a vehicle speed controller being configured to be operably activated by a user and the provision that, when the vehicle speed controller is operably activated by the user to use the output signal as an input speed control signal, the vehicle speed controller is further capable of being operated by the user to control the speed of the vehicle by an operation of any one of the clutch unit, the propulsion unit and the service brake, it becomes possible for the user to manually control the speed of the vehicle as a function of the position of the vehicle accelerator mechanism. In other words, it becomes possible to provide a vehicle speed control function which is based on using a position of a manually controlled vehicle accelerator mechanism as an input to operate any one of the clutch unit, the propulsion unit and the service brake so that the vehicle speed can be better controlled when the vehicle is required to be operated at a low speed, or very low speed (typically corresponding to creep drive). To this end, the example embodiments provide an improved creep drive speed control.

Figures 3A, 3B:
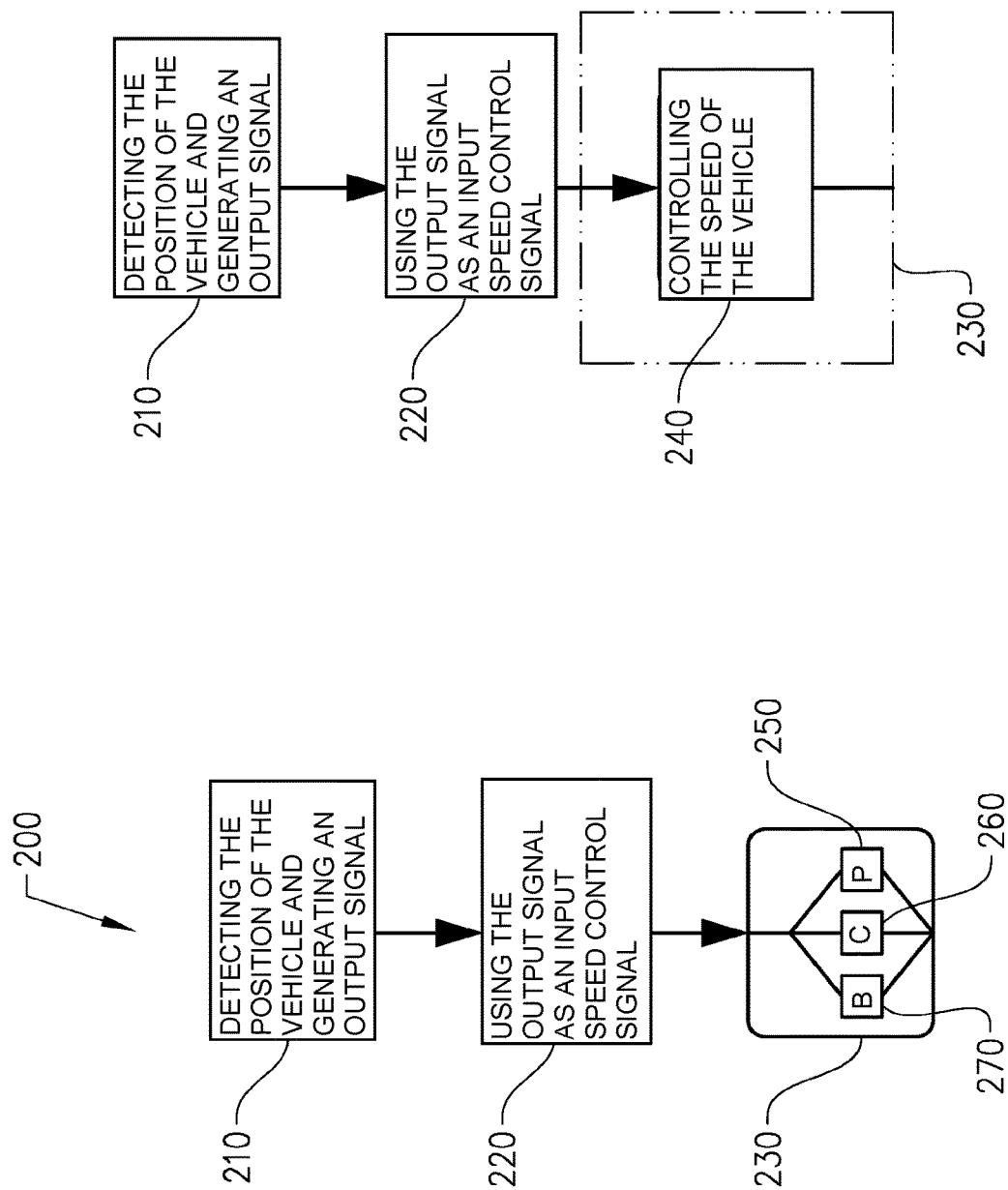
FIG. 3a discloses a graphic representation of a method for controlling speed of a vehicle by a vehicle speed control system according to an example embodiment of the present invention.
FIG. 3b discloses a graphic representation of further steps of a method for controlling speed of a vehicle by a vehicle speed control system according to an example embodiment of the present invention.

FIG. 3a is a graphic representation of a method for controlling speed of a vehicle by a vehicle speed control system according to an example embodiment as described in relation to any one of the FIGS. 2a-2g. The method is suitably, but not strictly necessarily, operated by the vehicle speed controller as mentioned above. The vehicle speed controller may include a processing circuitry, a microprocessor, microcontroller, programmable digital signal processor or another programmable device. The vehicle speed controller may also, or instead, include an application specific integrated circuit, a programmable gate array or programmable array logic, a programmable logic device, or a digital signal processor. Where the vehicle speed controller includes a programmable device such as the microprocessor, microcontroller or programmable digital signal processor mentioned above, the processor may further include computer executable code that controls operation of the programmable device.

In FIG. 3a, there is thus illustrated a method 200 of controlling speed of the vehicle by the vehicle speed control system, as described in relation to the previous figures. Briefly, the system here comprises a vehicle accelerator mechanism moveable between a plurality of positions and detection means configured to detect a position of the vehicle accelerator mechanism and a vehicle speed controller connected to the detection means. The method 200 comprises the steps of:

- detecting 210 the position of the vehicle accelerator mechanism by the detection means and generating an output signal indicative of the position of the vehicle accelerator mechanism,
- using 220 said output signal as an input speed control signal upon activation of the vehicle speed controller by a user, wherein, when said vehicle speed controller is operably activated by the user to use said output signal as an input speed control signal.

Moreover, the method 200 further comprises the step of operating 230 any one of a clutch unit, a propulsion unit and a service brake in the vehicle to control the speed of the vehicle so that a user is permitted to manually control the speed of the vehicle as a function of the position of the vehicle accelerator mechanism.

FIG. 3*b* discloses a graphic representation of further steps of the method for controlling speed of the vehicle by the vehicle speed control system according to an example embodiment of the present invention. Besides the method steps as described in relation to FIG. 3*a*, the method in this example embodiment further comprises the step 240 of controlling the speed of the vehicle by operating any one of the clutch unit, the propulsion unit and the service brake based on data reflecting vehicle speed rating as a function of the position of the vehicle accelerator mechanism 20.

As shown in FIG. 3*a*, the step 230 may include several optional steps 250, 260, 270, as described hereinafter, that can be performed either alone or in a combination. In addition, or alternatively, these optional steps may be performed in order or concurrently depending on the configuration of the method and the system.

Typically, although not strictly required, the step 230 of operating the propulsion unit further comprises the step 250 of controlling the speed of the vehicle by adjusting the rotational speed of a propulsion unit.

Typically, although not strictly required, the step 230 of operating the clutch unit further comprises the step 260 of controlling the speed of the vehicle by adjusting the clutch engagement of the clutch unit. In a configuration when the clutch unit is a dual-clutch assembly, the step 260 of controlling the speed of the vehicle by adjusting the clutch engagement of the clutch unit may further comprise the step of sequentially engaging a first clutch and a second clutch of the dual clutch assembly. In this manner, it becomes possible to keep the level of heat which is generated due to the engagement on a sufficiently low level.

Typically, although not strictly required, the step 230 of operating the service brake further comprises the step 270 of controlling the speed of the vehicle by actively controlling the service brakes to maintain a constant vehicle speed. It is to be noted that the braking effect may be varied as desired by only activating one of several service brakes of the vehicle.

Further, it is to be noted that any one of the example embodiments of the present invention may include a computer program comprising program code means for performing the method steps of the present invention, as described above, when the program is run on a computer.

Accordingly, any one of the example embodiments of the present invention may be provided with a computer readable medium carrying a computer program comprising program code means for performing the method steps of the present invention, as described above, when the program product is run on a computer.

Thus, there is also provided a computer program comprising program code means for performing the steps of any one of the example embodiments as described in relation to FIGS. 3*a* and 3*b*.

Further, there is provided a computer readable medium carrying a computer program comprising program code means for performing the steps of any one of the example embodiments as described in relation to FIGS. 3*a* and 3*b* when said program product is run on a computer.

Accordingly, the invention also relates to a computer program, computer program product and a storage medium for a computer all to be used with a computer for executing the method as described in any one of the above examples. As an example, the vehicle speed controller 80, as described above, may according to one example embodiment of the invention comprise a non-volatile memory, a processor and a read and write memory. The memory may have a first memory part, in which a computer program for controlling the vehicle speed controller 80 is stored. The computer program in the memory part for controlling the vehicle speed controller 80 can be an operating system. The vehicle speed controller 80 can be enclosed in, for example, a separate control unit or integrated in another vehicle component as described in relation to the FIGS. 2*a*-2*g*. The vehicle speed controller 80 can comprise, for example, a microcomputer.

Typically, although not strictly required, the vehicle speed controller 80 is configured for communication with the detection means, the clutch unit, the propulsion unit, the service brake and any other component by one or several data bus.

The method of the example embodiments as described in relation to the FIGS. 3*a*-3*b* can be executed by the vehicle speed controller 80. In addition, or alternatively, the method of the example embodiments as described in relation to the FIGS. 3*a*-3*b* can be executed by the vehicle speed controller 80 running the program stored in a memory of the vehicle speed controller 80. In addition, or alternatively, the method of the example embodiments as described in relation to the FIGS. 3*a*-3*b* can be executed by the program stored in the non-volatile storage medium of the vehicle speed controller 80.

FIG. 4*a*-4*d* schematically illustrate various examples of operations of a vehicle, in which an example embodiment of the invention is installed in the vehicle for controlling speed of the vehicle when there is a desire to operate the vehicle at low speed.

Figure 4A:
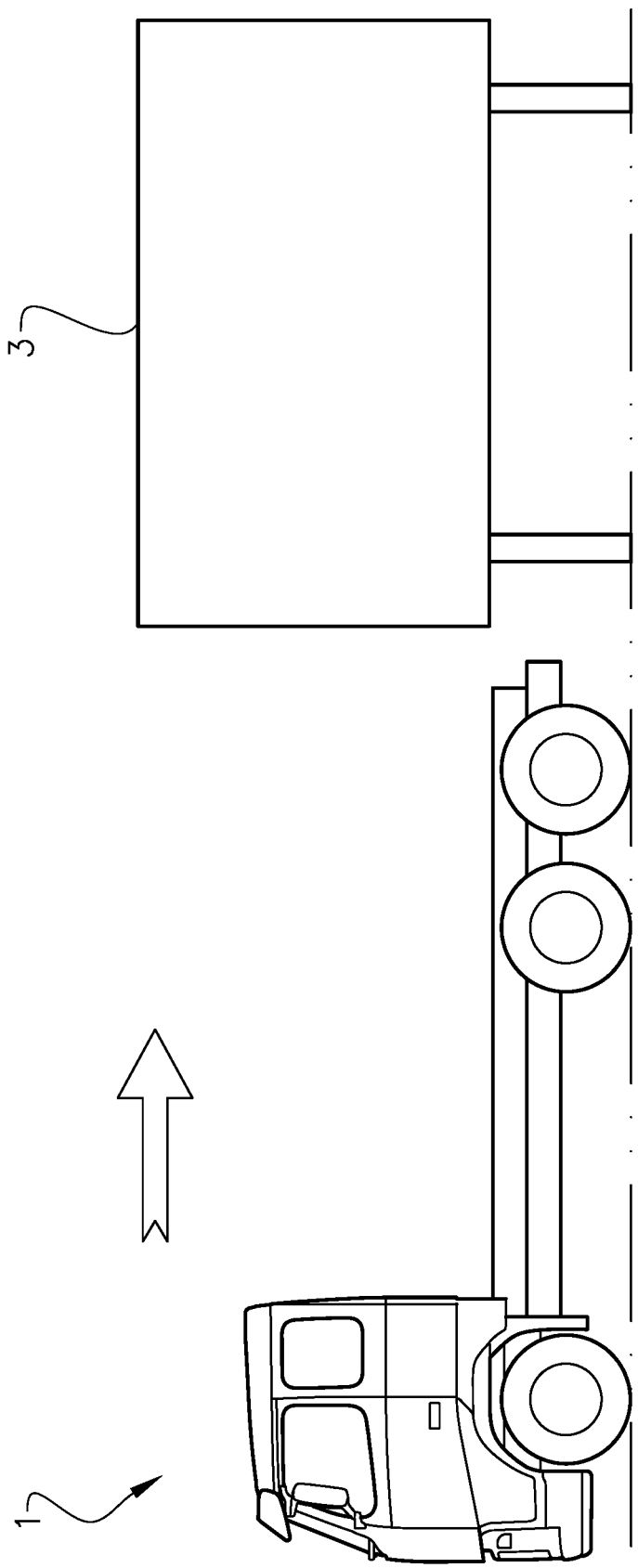
FIGS. 4a-4d schematically illustrate various examples on operations of a vehicle, in which an example embodiment of the invention is installed in the vehicle for controlling speed of the vehicle when there is a desire to operate the vehicle at low speed.

FIG. 4*a* schematically illustrates an example of an operation of a vehicle, in which a truck is operated in a reverse direction to couple to a swap body 3. This type of operation typically requires that the truck is operated at a low speed, or a very low speed, sometimes herein denoted as the creep speed. By installing the system or implementing the method according to example embodiments in a vehicle as shown in FIG. 4*a*, the speed of the vehicle can be controlled in an improved manner so as to ensure that the truck can couple the swap body in an efficient and secure manner, typically requiring that the truck is operated in the reverse direction at a very low speed. Alternatively, the truck may couple to a trailer (not shown), such as a cargo trailer, requiring a similar type of operation at a low speed in the reverse direction. The trailer may for instance be coupled to the truck by means of a king pin, hooked to a horseshoe-shaped quick-release coupling device called a fifth wheel or a turntable hitch at the rear of the truck that allows easy hook up and release. Alternatively, the truck may be operated at a low speed in the reverse direction when the truck is about to approach a loading platform, loading dock or the like. Other types of operations may also be conceivable when the truck is required to be operated at a low speed, thus using the advantages of the example embodiments as described herein.

Figure 4B:
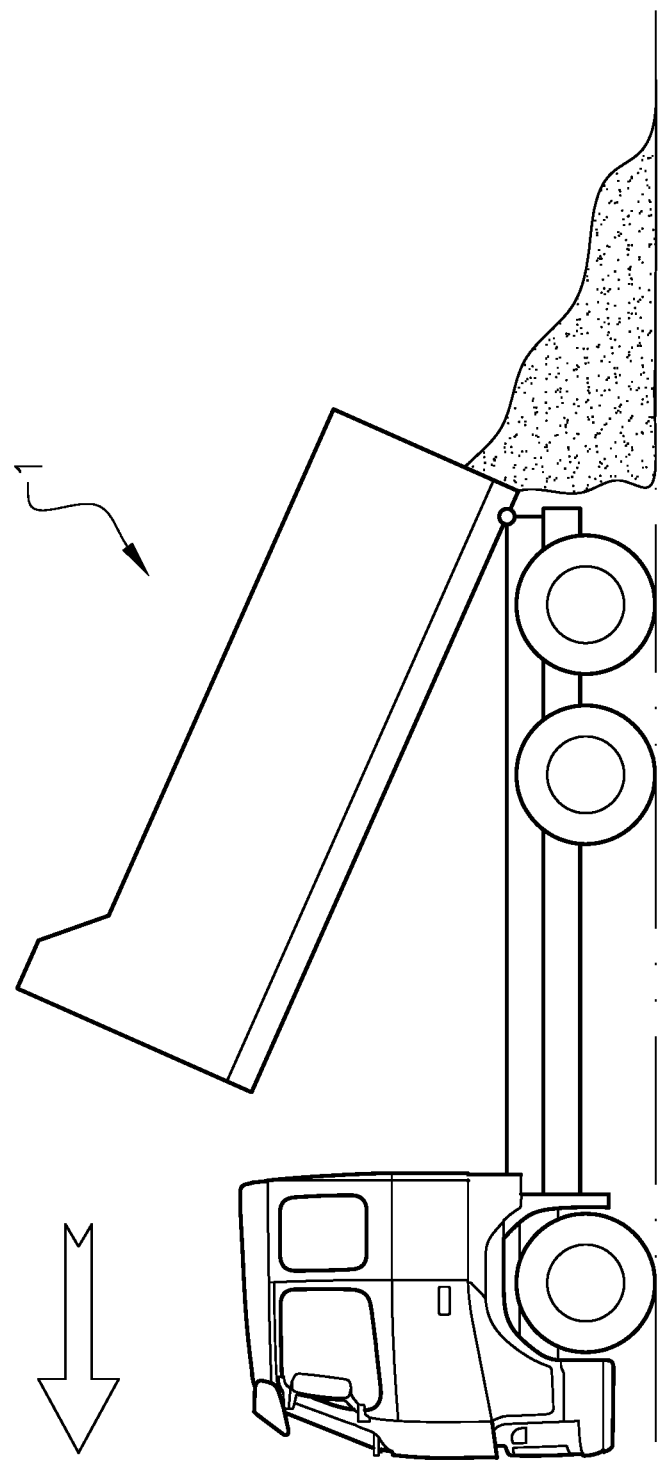

FIG. 4b schematically illustrate an example of an operation of a vehicle, in which a truck, such as dumper, dump truck, articulated dump truck or the like is depositing material on the ground behind the truck. This type of operation typically requires that the truck is operated at low speed, or a very low speed, sometimes herein denoted as the creep speed. By installing the system or implementing the method according to example embodiments in a vehicle as shown in FIG. 4b, the speed of the vehicle can be controlled in an improved manner when there is a desire to operate the vehicle at low speed, or very low speed. A dumper, dump truck, articulated dump truck is a truck used for transporting loose material such as sand, gravel, asphalt concrete or the like, and may be equipped with an open-box bed, which is hinged at the rear and further equipped with hydraulic positions to lift the front, allowing the material in the bed to be deposited on the ground behind the truck. This type of truck may also be referred to as a tipper, tip truck or the like. In another example, the dump truck may be operated at a low speed to deposit asphalt concrete to a machine laying asphalt concrete on the ground. In another type of operation, the user of another vehicle such as the user of the asphalt machine (not shown) may desire to control the operation of the truck 1 by a remote vehicle speed controller (remote control unit 96), as described in relation to FIG. 2e.

In some example embodiments, the vehicle speed controller may also be configured for operating another supplementary operation of the vehicle, e.g. a depositing of the material such as the asphalt concrete. In this type of operation, the user may desire to charge a high level of effect from vehicle typically in order to operate another machine equipment installed in the vehicle such as a hydraulic machine or hydraulic motor for operating the depositing unit of the truck. Typically, this type of operation may require more effect for working in a satisfactory manner, due to e.g. heavy loading, than the effect required for moving the vehicle along the road. Thus, the engine speed of the propulsion unit may in some example embodiments be adjusted separately from the speed of the vehicle so that the effect from the propulsion unit can be increased without increasing the speed of the vehicle.

Figure 4C:
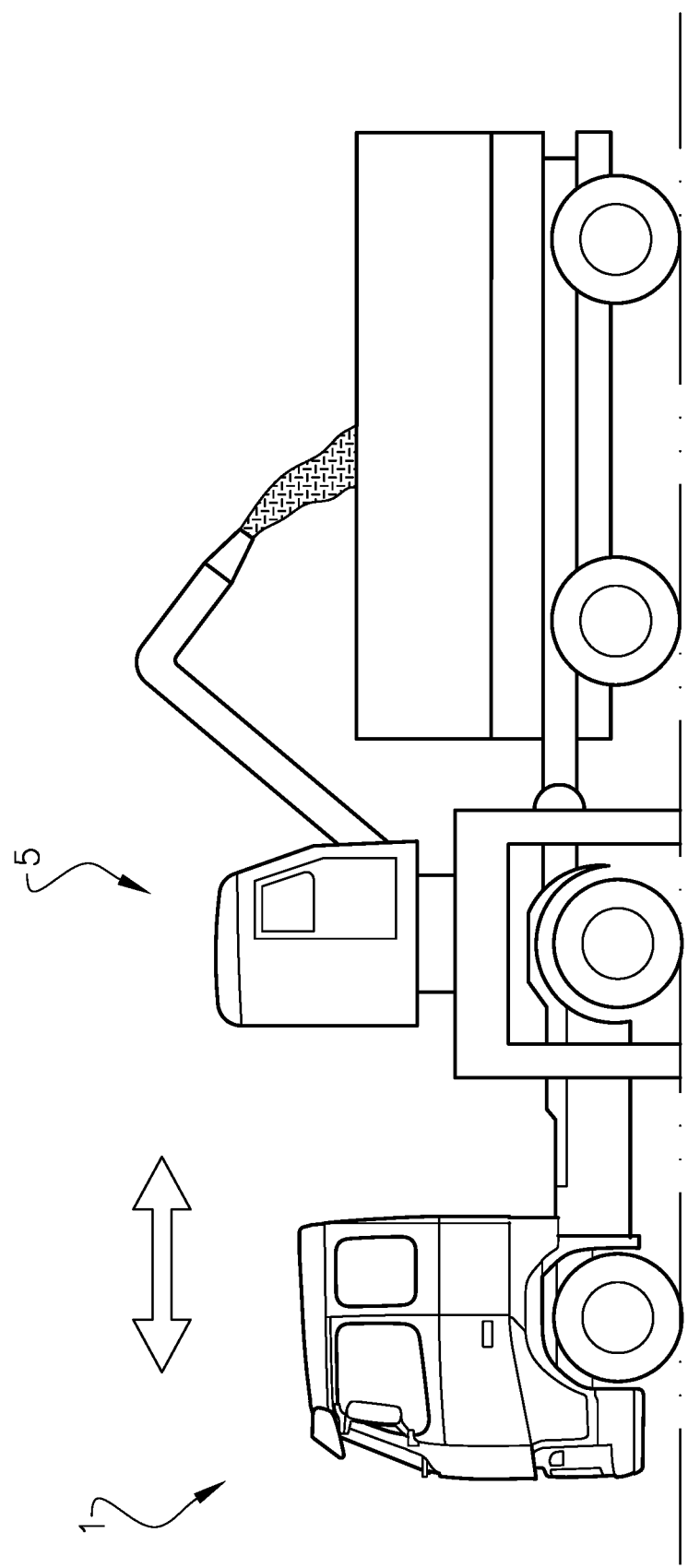

FIG. 4c schematically illustrate another example of an operation of a vehicle, in which a truck 1, such as a logging truck or a truck for transporting wood chips is loaded by means of a stationary woodchipper machine 5. Similar to the example described in relation to FIGS. 4a and 4b, this type of operation typically requires that the truck is operated at low speed, or a very low speed. By installing the system or implementing the method according to example embodiments in a vehicle as shown in FIG. 4c, the speed of the vehicle can be controlled in an improved manner while the trailer is loaded with wood chips by the woodchipper machine. By operating the truck to move at a very low speed it becomes possible for the woodchipper machine to deposit the wood chips in an efficient manner while distributing the wood chips along the length of the trailer. In another example embodiment, the truck may be used for transporting other materials such as wood shavings, sugar canes, crops or the like. Analogously to the example as described in relation to FIG. 4b, the user of another vehicle such as the user of the stationary woodchipper machine 5 may desire to control the operation of the truck 1 by a remote vehicle speed controller (remote control unit 96), as described in relation to FIG. 2e.

Figure 4D:
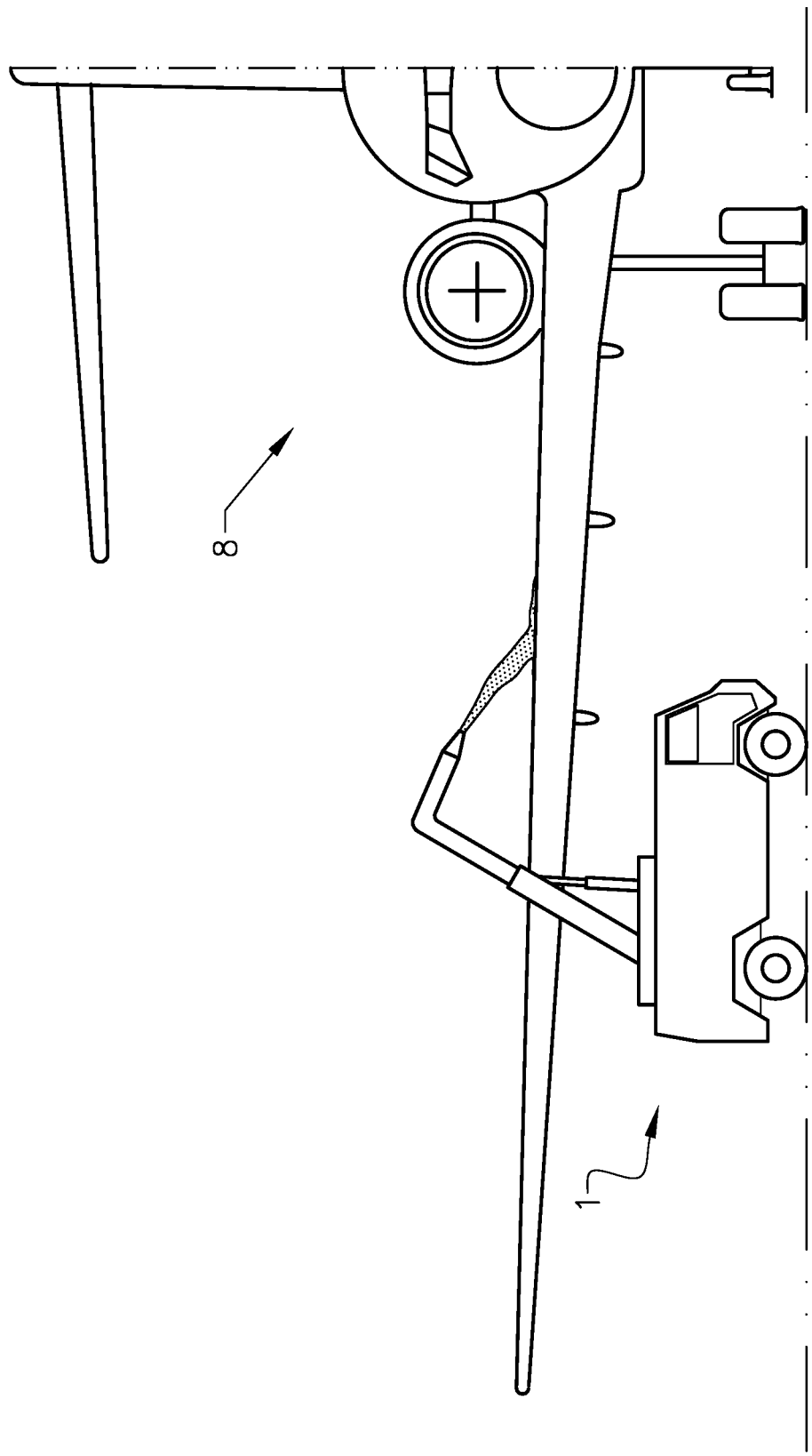

FIG. 4d schematically illustrates an example of yet another operation of a vehicle, in which a working machine 1 is depositing material on the surfaces of an air plane 8. As an example, the material to be deposited may be an anti-freezing agent such as glycol. This type of operation typically requires that the vehicle is operated at a low speed, or a very low speed, so that the deposited material is distributed in an even layer on the surfaces of the air plane. By installing the system or implementing the method according to example embodiments in a vehicle as shown in FIG. 4d, the speed of the vehicle can be controlled in an improved manner when there is a desire to operate the vehicle at a low speed, or very low speed.

Other types of operations, in which the example embodiments are particularly useful may also be conceivable such as fire-fighting vehicles or vehicles for filling cracks on roads.

Although the invention has been described in relation to specific combinations of specific propulsion units, clutch units, and service brake units, it should be readily appreciated that a use of other types of units may be combined in other configurations as well which is clear for the skilled person when studying the present application. Also, the present disclosure has mainly been made for running a vehicle in the forward direction and it should hence be readily understood that the invention is equally applicable for reverse driving as well. Thus, the above description of the example embodiment of the present invention and the accompanying drawings are to be regarded as a non-limiting example of the invention and the scope of protection is defined by the appended claims. Any reference sign in the claims should not be construed as limiting the scope.

The invention claimed is:

1. A vehicle speed control system comprising:
a vehicle accelerator mechanism manually moveable between a plurality of positions, each of the plurality of positions having a deflection angle,
detection means configured to detect the deflection angle of the vehicle accelerator mechanism and to generate an output signal indicative of the deflection angle of the vehicle accelerator mechanism, and
a vehicle speed controller comprising a user interface, the vehicle speed controller configured to use the output signal as an input speed control signal such that the vehicle speed controller establishes a speed of the vehicle as a function of the detected deflection angle of the vehicle accelerator mechanism,
wherein the vehicle speed controller is configured to operate any one of a clutch unit, propulsion unit and service brake,
wherein the vehicle speed controller is configured to establish a speed of the vehicle as a function of the input speed control signal and control the speed of the vehicle by an operation of any one of the clutch unit, the propulsion unit and the service brake, thus allowing the user to manually control the speed of the vehicle as a function of the deflection angle of the vehicle accelerator mechanism,
wherein the vehicle speed controller comprises data reflecting vehicle speed as a function of the position of the vehicle accelerator mechanism, wherein the vehicle speed controller is configured to operate any one of the clutch unit, the propulsion unit and the service brake based on the data to control the speed of the vehicle, wherein the user interface is configured for receiving user-specific data to permit the user to set a user-specific vehicle speed as a function of the position of the vehicle accelerator mechanism, and wherein the vehicle speed controller is configured to permit the user to set an user-specific vehicle acceleration and retardation as a function of the position change per time unit of the vehicle accelerator mechanism.

2. The vehicle speed control according to claim 1, wherein a swivel range of the vehicle accelerator mechanism, as defined by the plurality of the positions of vehicle accelerator mechanism, corresponds to a vehicle speed range between 0-20 km/h.

3. The vehicle speed control system according to claim 1, wherein a swivel range of the vehicle accelerator mechanism, as defined by the plurality of the positions of vehicle accelerator mechanism, is defined so that a maximum vehicle is less than 20 km/h.

4. The vehicle speed control system according to claim 1, wherein a first part of a swivel range of the vehicle accelerator mechanism, as defined by the plurality of the positions of vehicle accelerator mechanism, corresponds to a low speed range of 0-5 km/h, wherein the vehicle speed controller is further configured to disable the activation of manually controlling the speed of the vehicle as a function of the position of the vehicle accelerator mechanism if the vehicle accelerator mechanism is moved in a position outside the first part of the swivel range.

5. The vehicle speed control system according to claim 1, wherein the vehicle speed controller is configured to use the output signal as an input control speed signal through activation by the user via any one of a cruise control unit, gear shift member, interior vehicle user-interface, remote control unit, voice control unit.

6. The vehicle speed control system according to claim 1, wherein the operation of any one of the clutch unit, the propulsion unit and the service brake via the vehicle speed controller is operable by the user via a cruise control unit, gear shift member, interior vehicle user-interface, remote control unit, voice control unit.

7. A vehicle comprising the vehicle speed control system according to claim 1, wherein the vehicle speed control system is operably connected to the vehicle.

8. The vehicle according to claim 7, further comprises the propulsion unit for powering the vehicle, the clutch unit for transmitting a rotational torque from the propulsion unit to a driven shaft and the service brake unit for braking the vehicle.

9. The vehicle according to claim 8, wherein the propulsion unit is any one of internal combustion engine, electric engine, and hydraulic machine.

* * * * *